(12) United States Patent
Shirakawa et al.

(10) Patent No.: US 7,050,098 B2
(45) Date of Patent: May 23, 2006

(54) SIGNAL PROCESSING APPARATUS AND METHOD, AND IMAGE SENSING APPARATUS HAVING A PLURALITY OF IMAGE SENSING REGIONS PER IMAGE FRAME

(75) Inventors: Yusuke Shirakawa, Kanagawa (JP); Shinichi Hagiwara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 695 days.

(21) Appl. No.: 10/105,743

(22) Filed: Mar. 25, 2002

(65) Prior Publication Data

US 2002/0140830 A1 Oct. 3, 2002

(30) Foreign Application Priority Data

Mar. 29, 2001 (JP) .............................. 2001-097032
May 7, 2001 (JP) .............................. 2001-136557

(51) Int. Cl.
*H04N 9/64* (2006.01)
(52) U.S. Cl. ..................................................... 348/245
(58) Field of Classification Search ................. None
See application file for complete search history.

(56) References Cited

U.S. PATENT DOCUMENTS

| | | | |
|---|---|---|---|
| 4,216,503 A | | 8/1980 | Wiggins |
| 4,525,741 A | | 6/1985 | Chahal et al. |
| 5,070,414 A | | 12/1991 | Tsutsumi |
| 5,153,929 A | | 10/1992 | Itagaki |
| 5,260,794 A | * | 11/1993 | Sase et al. ................... 348/695 |
| 5,737,015 A | | 4/1998 | Juen |
| 5,940,125 A | | 8/1999 | Suganuma ................... 348/243 |
| 5,969,759 A | * | 10/1999 | Morimoto ................... 348/311 |
| 6,084,634 A | * | 7/2000 | Inagaki et al. .............. 348/294 |
| 6,337,713 B1 | | 1/2002 | Sato |
| 6,700,609 B1 | * | 3/2004 | Abe ........................... 348/243 |
| 6,721,009 B1 | * | 4/2004 | Iizuka ......................... 348/314 |
| 6,791,615 B1 | * | 9/2004 | Shiomi et al. .............. 348/323 |

FOREIGN PATENT DOCUMENTS

| | | |
|---|---|---|
| EP | 1 079 602 A2 | 0/2001 |
| EP | 0 488 674 A2 | 11/1991 |
| EP | 0 796 008 A2 | 3/1997 |
| EP | 1 033 868 A1 | 2/2000 |
| EP | 1033 868 * | 6/2000 |
| EP | 1 081 942 A1 | 8/2000 |

(Continued)

OTHER PUBLICATIONS

English language abstract of Japanese Patent 3-074991, Mar. 29, 1991.

(Continued)

*Primary Examiner*—David Ometz
*Assistant Examiner*—Hung Lam
(74) *Attorney, Agent, or Firm*—Morgan & Finnegan, L.L.P.

(57) ABSTRACT

In processing an image signal output from an image sensing unit which includes a plurality of image sensing regions constructing one frame and a plurality of output terminals in one-to-one correspondence with the plurality of image sensing regions, and which outputs, from each of the plurality of output terminals, an image signal pertaining to image sensing in a corresponding image sensing region and a dummy image signal concerning the corresponding image sensing region, offset differences between a plurality of image signals output from the plurality of output terminals are reduced on the basis of a plurality of dummy image signals output from the plurality of output terminals. The plurality of dummy image signals are independent of electric charge obtained from photoelectric converters of the image sensing unit.

8 Claims, 20 Drawing Sheets

FOREIGN PATENT DOCUMENTS

| | | |
|---|---|---|
| JP | 4-113766 | 0/1992 |
| JP | 5-292242 | 0/1993 |
| JP | 9-298647 | 0/1997 |
| JP | 64-085483 | 0/1989 |
| JP | 2001-61104 | 0/2001 |
| JP | 3-74991 | 3/1991 |
| JP | 5-137059 | 6/1993 |
| JP | 6-141246 | 5/1994 |
| JP | 7-38812 | 2/1995 |
| JP | 7-38814 | 2/1995 |
| JP | 7-75023 | 3/1995 |
| JP | 10-336529 | 12/1998 |
| JP | 11-5558 | 1/1999 |
| JP | 11-55558 | 2/1999 |
| JP | A 2000-253305 | 9/2000 |
| JP | A 2001-78095 | 3/2001 |

OTHER PUBLICATIONS

English language abstract of Japanese Patent 5-137059, Jun. 1, 1993.

English language abstract of Japanese Patent 6-141246, May 20, 1994.

English language abstract of Japanese Patent 11-055558, Patent 11-055558, Feb. 26, 1999.

\* cited by examiner

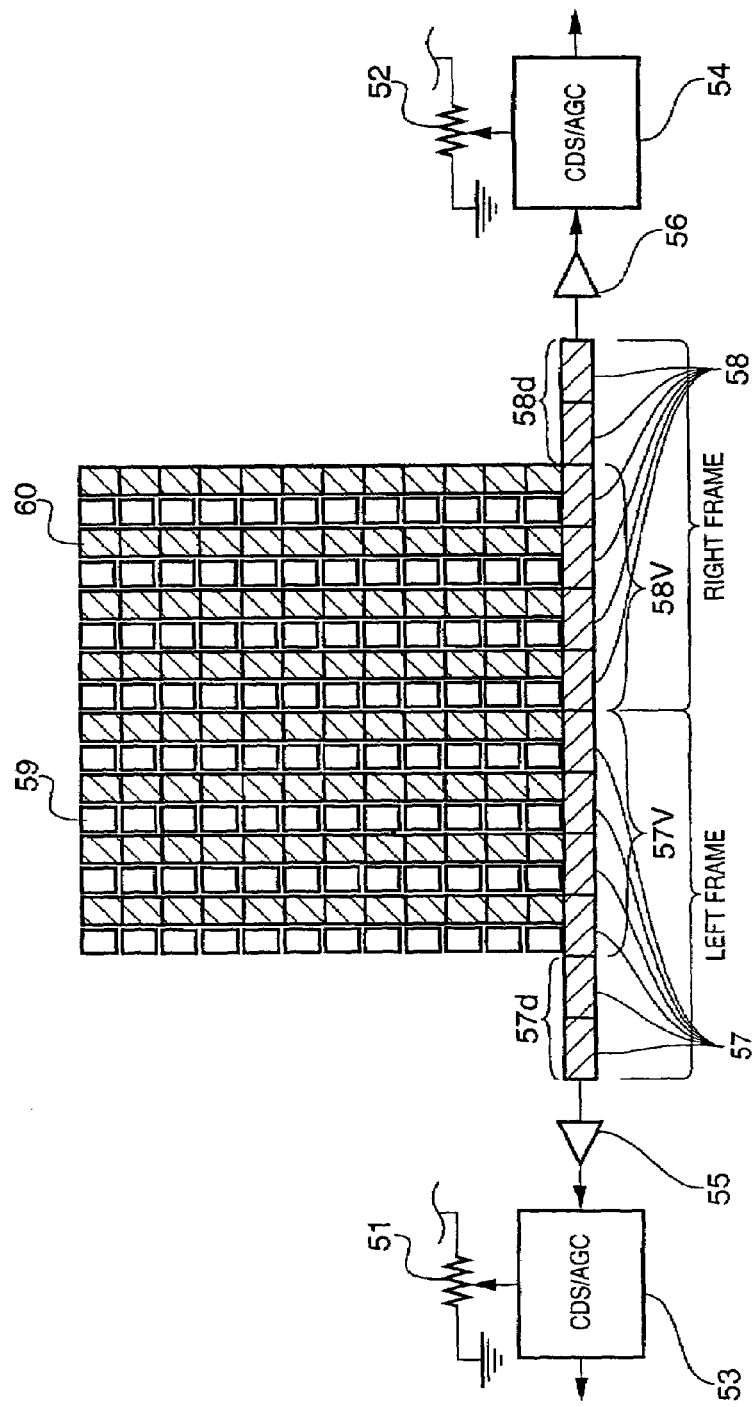

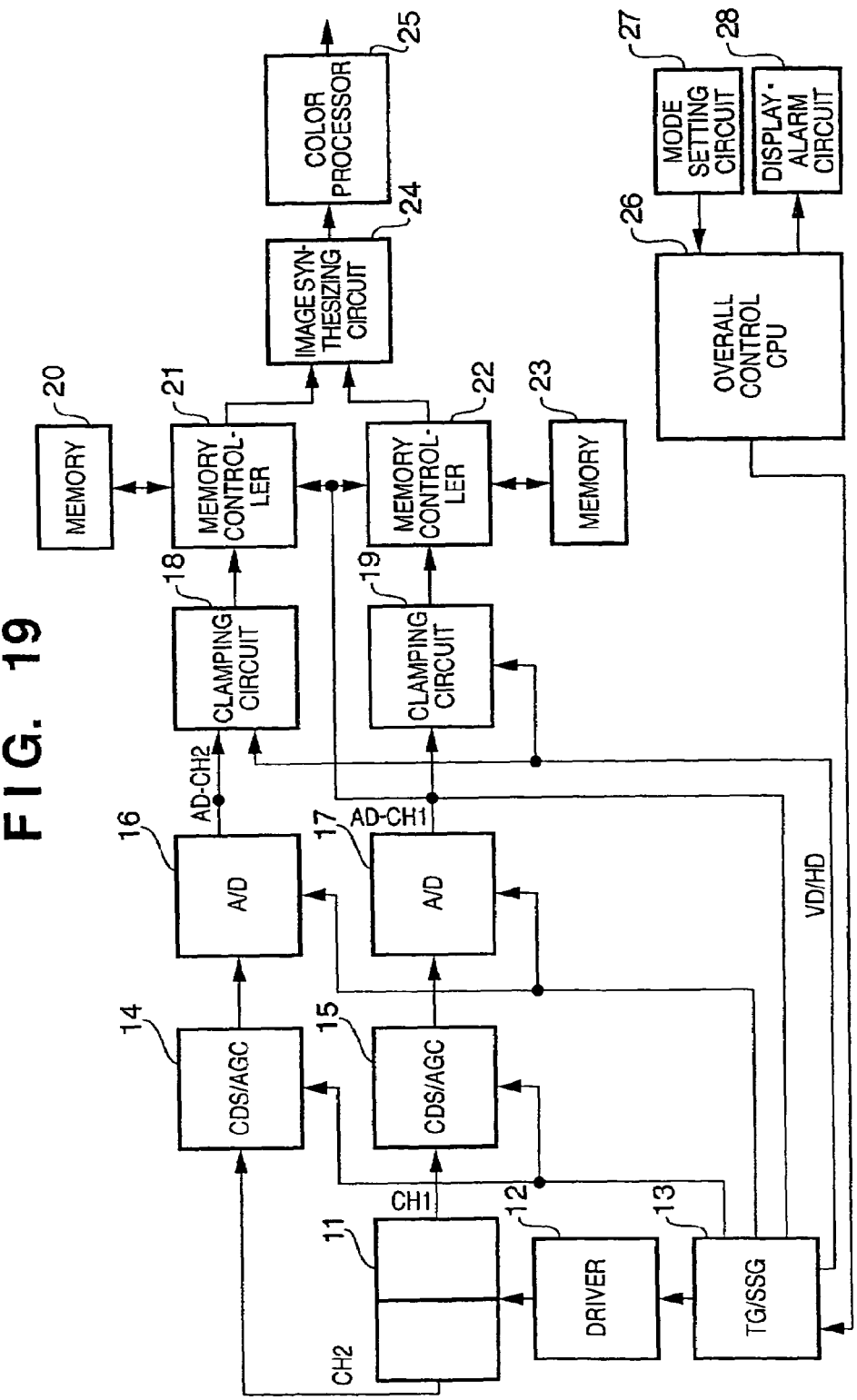

SIGNAL PROCESSING APPARATUS AND METHOD, AND IMAGE SENSING APPARATUS HAVING A PLURALITY OF IMAGE SENSING REGIONS PER IMAGE FRAME

FIELD OF THE INVENTION

The present invention relates to a signal processing apparatus, signal processing method, and image sensing apparatus and, more particularly, to a signal processing apparatus and signal processing method of processing image signals, and an image sensing apparatus to which these apparatus and method are applied.

BACKGROUND OF THE INVENTION

FIG. 16 shows the arrangement of a conventional image sensing device.

FIG. 16 is a view showing an outline of the arrangement of a generally used CCD. This CCD primarily includes a light receiving unit 1 comprising a plurality of photoelectric conversion elements, optical black (OB) units 2L and 2R in which light-shielding members are arranged on some photoelectric conversion elements in order to prevent light incidence on these photoelectric conversion elements, a horizontal transfer CCD (HCCD) 4, a vertical transfer CCD (VCCD, not shown), and a charge-voltage conversion amplifier 5.

A driving method of this CCD is to transfer electric charge generated in the light receiving unit 1 to the VCCD, and sequentially transfer this electric charge so as to read out the charge from the HCCD 4 for each horizontal line. The output from the HCCD 4 is subjected to charge-voltage conversion by the charge-voltage conversion amplifier 105, and the voltage signal is output.

FIG. 17 is a view showing the arrangement of a general digital camera. When a user operates a camera operation switch 101 (including, e.g., a main switch and a release switch), an overall control circuit 100 detects the operation and starts supplying power to other circuit blocks.

An object image in the field angle is formed on an image sensing device 104 via main photographing optical systems 102 and 103, and converted into an electrical signal by the image sensing device 104. The output electrical signal from this image sensing device 104 is supplied to an A/D conversion circuit 106 via a CDS/AGC circuit 105, and converted into a digital signal pixel-by-pixel by the A/D conversion circuit 106. On the basis of a signal provided by a timing generator 108 which determines driving timings as a whole, a driver circuit 107 controls charge accumulation in the image sensing device 104, charge transfer in the horizontal and vertical directions, and the like. Also, the CDS/AGC circuit 105 and the A/D conversion circuit 106 operate in accordance with the timings generated by the timing generator 108.

The output image signal from the A/D conversion circuit 106 is supplied to a memory controller 115 via a selector 109 controlled by the overall control CPU 100, and written in a frame memory 116. This image signal written in the frame memory 116 is read out by the memory controller 115 and transferred to a camera digital signal processor (DSP) 110 via the selector 109. This camera DSP 110 generates R, G, and B color signals on the basis of the image signal supplied from the frame memory 116.

In a state before photography, the result of processing by the camera DSP 110 is normally transferred periodically (frame-by-frame) to a video memory 111 to display a sensed image on a monitor display 112, thereby allowing this monitor display 112 to function as an electronic finder.

On the other hand, when the user designates photography by operating the camera operation switch 101, an image signal of one frame is read out from the frame memory 116 in accordance with control by the overall control CPU 100. This image signal is processed by the camera DSP 110, and the result is temporarily written in a work memory 113. The image signal written in the work memory 113 is compressed by a predetermined compression format by a compressor-expander 114, and the result is saved in an external nonvolatile memory 117 (e.g., a flash memory).

To observe a photographed image, an image signal compressed and saved in the external nonvolatile memory 117 is expanded by the compressor-expander 114. The result is transferred to the video memory 111 and displayed on the monitor display 112.

As described above, in this general digital camera the output signal from the image sensing device 104 is processed in almost real time and output to the memory or the monitor display.

To improve the performance of continuous shot photography or the like in the above digital camera, e.g., to realize a continuous shot photography capability of about 10 frames/sec, it is necessary to improve the whole system including the image sensing device, e.g., to increase the rate of read from the image sensing device and increase the rate of write of an image signal to the frame memory or the like.

In a conventional image sensing apparatus such as a digital video camera or digital still camera using a solid-state image sensing device such as a CCD, as disclosed in, e.g., Japanese Patent Laid-Open Nos. 5-137059 and 6-141246, the resolution is increased by sensing an object divisionally by using a plurality of CCDs, and obtaining a sensed image of the whole object by synthesizing these partial images by image processing.

Recently, an image sensing system using a CCD composed of a few million pixels has been developed, so various improvements for performing signal processing at high speed have been made.

Japanese Patent Laid-Open No. 3-74991 discloses an image reading apparatus which uses a plurality of image sensing devices for divisionally reading image information, and in which the image sensing ranges of adjacent image sensing devices are overlapped in the boundary, and images sensed by these image sensing devices are pasted in the boundary to obtain an image of the whole image information. In this image reading apparatus, a pixel position having a small spatial density change with respect to a nearby pixel is detected from constituent image data. In this pixel position, image data forming an image sensed by one image sensing device and image data forming an image sensed by the other image sensing device are pasted.

However, in either apparatus in which portions of an object image are divisionally sensed by a plurality of image sensing devices and these sensed images are pasted to obtain a sensed image of the whole object as described above, if these image sensing devices have sensitivity differences, image density gap will be noticeable due to these sensitivity differences in the pasted portions (boundaries). As a consequence, an unnatural sensed image is obtained.

Also, Japanese Patent Laid-Open Nos. 5-137059 and 6-141246 mentioned above disclose the technologies of divisionally sensing an object image by a plurality of image sensing devices. However, these references do not describe the problem of density gap in the boundaries between sensed images due to the sensitivity differences between the image sensing devices, and hence do not disclose any method of solving this problem.

To obtain a sensed image having inconspicuous pasted portions, Japanese Patent Laid-Open No. 3-74991 discloses a method of improving poor image quality such as image disturbance in boundaries. Since, however, two partial images are simply pasted by detecting line-by-line a position at which a density change in the boundary is small, the pasting process is complicated and time-consuming.

In addition, this method merely controls the pasting position of two sensed images for each lateral line. Therefore, it is difficult to effectively suppress abrupt density changes in boundaries in the longitudinal direction. In particular, it is difficult to effectively reduce density gap in boundaries by sensitivity differences between image sensing devices and thereby obtain a sensed image having inconspicuous pasted portions.

As a method of improving this difficulty, Japanese Patent Laid-Open No. 11-055558 proposes a digital camera which divisionally senses the left and right portions of an object image by two CCDs arranged such that the sensed images overlap each other in the boundary. These two sensed images are stored in an image memory via an analog signal processor and an A/D converter. After that, a shading corrector corrects variations in the sensitivity distribution in the image sensing surface. Then, an image synthesizer pastes the portions in the boundary to generate a sensed image of the entire object.

In this method, an image of a boundary portion is generated by reducing a density difference in the boundary portion by performing processing such as average value calculation. A sensed image is generated by synthesizing this boundary image and the left and right images excluding the boundary image. However, an optical image of an object must be supplied to a plurality of image sensing devices after being divided into a plurality of images partly overlapping each other. A three-dimensional space required by this method increases the size of the apparatus, requires high assembly accuracy, and consequently increases the manufacturing cost.

FIG. 18 is a view schematically showing the device structure of a two-output-type CCD image sensing device obtained by splitting a horizontal transfer CCD.

In this image sensing device shown in FIG. 18, electric charge generated pixel-by-pixel in a photodiode unit 59 is transferred to a vertical transfer CCD (VCCD) 60 at once at a predetermined timing. At the next timing, this electric charge in the VCCD 60 is transferred line-by-line to left and right horizontal transfer CCDs (HCCDs) 57 and 58. The HCCD 57 transfers this electric charge to a left amplifier 55 for each transfer clock, and the HCCD 58 transfers the electric charge to a right amplifier 56 for each transfer clock. In this image sensing device, therefore, a sensed image signal is read out as it is divided into two, left and right regions on the two sides of the center of the frame. Although not shown, optical black (OB) units shielded from light by, e.g., aluminum are present on the left and right ends of an effective pixel area which, among other pixels, generates electric charge when exposed.

FIG. 19 is a block diagram of a signal processing circuit for processing an output signal from an image sensing device of the type shown in FIG. 18. Left and right image signals sensed by a CCD 11 are subjected to CDS/AGC processing by two CDS/AGC circuits 14 and 15 and converted into digital signals by two A/D conversion circuits 16 and 17, respectively. These digital signals are stored in frame memories 20 and 23.

Since the image sensing device 11 and the CDS/AGC circuits 14 and 15 are AC-coupled, DC components are removed when image signals are input from the image sensing device 11 to the CDS/AGC circuits 14 and 15. To regenerate these DC components, clamping circuits 18 and 19 clamp the image signals sensed in the left and right regions of the image sensing device 11 in accordance with the pixel values of Optical Black (OB) pixel portions in these regions. That is, the levels of the whole image signals sensed in the left and right regions of the image sensing device 11 are adjusted such that the pixel values of these OB pixel portions have a predetermined level.

As described above, the OB pixel portions of the image sensing device 11 are positioned on the left and right ends of the effective pixel area. The pixel values of these OB pixel portions are slightly different owing to shading of a dark current and the like. Accordingly, when the frame is divided into two, left and right regions and DC levels are regenerated by separately clamping image signals in these left and right regions on the basis of the pixel values of the OB pixel portions, an offset difference is produced between the left and right regions of the frame. Consequently, an image having different DC levels corresponding to the level difference between the pixel values of the two OB pixel portions is obtained.

The left and right image signals thus processed separately are synthesized by an image synthesizing circuit 24. A color processor 25 performs color processing such as color interpolation and gamma conversion for the synthetic image signal, thereby forming an image signal of one image.

This technology of equipping an image sensing device with a plurality of output terminals and simultaneously reading out image signals from these output terminals is an essential technology of allowing future digital cameras to approach or exceed the performance of silver halide cameras (a single-lens reflex camera capable of photographing about 8 frames/sec is already realized as a product).

This technology of equipping an image sensing device with a plurality of output terminals is advantageous in speed. However, the technology is obviously more disadvantageous than a single-output image sensing device from a viewpoint of output level matching.

That is, to regenerate a DC component removed when an image signal is supplied to the CDS/AGC circuit, the CDS/AGC circuit or the camera DSP conventionally performs a clamping process in each region of an image sensing device on the basis of the optical black (OB) level. In this method, however, if there is a difference between the OB level for determining the clamp level and the black level of an effective pixel area, or if OB levels output from a plurality of output terminals of the image sensing device are different owing to dark current shading, offset differences between the outputs from the plurality of regions of the image sensing device cannot be completely removed. Consequently, boundaries between the plurality of regions appear in the synthetic image.

Accordingly, it is an important subject to remove offset differences between output image signals from a plurality of output terminals of an image sensing device.

This will be explained in more detail with reference to FIGS. 20A and 20B.

FIG. 20A shows the arrangement of another conventional image sensing device.

That is, FIG. 20A is a view showing an arrangement for dividing a photoelectric conversion output from a light receiving unit 1 to two, left and right horizontal transfer CCDs (HCCDs) 4L and 4R and simultaneously reading out these outputs. In this image sensing device having the configuration shown in FIG. 20A, photoelectric conversion outputs are transferred in the form of electric charge by the HCCDs 4L and 4R for each horizontal line. More specifically, the left-half and right-half photoelectric conversion outputs are transferred in the form of electric charge to the left and right by the HCCDs 4L and 4R, respectively, and subjected to charge-voltage conversion by discretely prepared charge-voltage conversion amplifiers 5L and 5R.

In this configuration, read operations can be performed parallel by the two HCCDs 4L and 4R. So, one frame can be read out in a driving time half that of the configuration shown in FIG. 16.

Additionally, in the arrangement shown in FIG. 20A, the image sensing unit is realized by one CCD. Since means such as an optical path divider is unnecessary, it is possible to simplify the arrangement of the image sensing system and reduce the cost of the system. However, the left and right regions of a sensed image are separately read out by the independent systems (i.e., the HCCD 4L and the amplifier 5L, and the HCCD 4R and the amplifier 5R). So, a difference in the boundary is conspicuous.

FIG. 20B shows examples of photoelectric conversion outputs of one horizontal line indicated by a–a' in FIG. 20A.

FIG. 20A shows an example of a landscape on a clear day in which the sun, mountains, trees, and grass are shown. Referring to FIG. 20B, a level A indicates an output from an OB portion 2R in FIG. 20A, a level B indicates an output from an OB portion 2L, and a level C indicates an output from a portion corresponding to the sun. A difference D is a level difference produced when the image is read out by the left and right independent systems described above.

A method of making this level difference be naturally seen in the frame is called frame matching. One example is a method of making a density difference in a boundary inconspicuous. This method is to correct the density difference in the boundary on the basis of the degree of correlation obtained from image data in the boundary. Improving the accuracy of this method requires a countermeasure against a dark current which lowers the S/N.

SUMMARY OF THE INVENTION

The present invention has been made in consideration of the above situation, and has as its object to provide a technology for reducing offset differences between a plurality of image signals output from a plurality of output terminals formed in one-to-one correspondence with a plurality of regions of an image sensing device, thereby obtaining a good image having natural boundaries between the regions.

It is another object of the present invention to cope with an increase of the number of pixels of an image sensing device.

According to the present invention, the foregoing object is attained by providing a signal processing apparatus for processing an image signal, comprising: an image sensing unit which comprises a plurality of image sensing regions constructing one frame and a plurality of output terminals in one-to-one correspondence with the plurality of image sensing regions, and which outputs, from each of the plurality of output terminals, an image signal pertaining to image sensing in a corresponding image sensing region and a dummy image signal concerning the corresponding image sensing region; and a processor adapted to reduce offset differences between a plurality of image signals output from the plurality of output terminals, on the basis of a plurality of dummy image signals output from the plurality of output terminals, wherein the plurality of dummy image signals are independent of electric charge obtained from photoelectric converters of the image sensing unit.

According to the present invention, the foregoing object is also attained by providing a signal processing apparatus for processing an image signal, comprising a plurality of vertical transfer units for transferring signals from a plurality of photoelectric converters of a plurality of image sensing regions in which the plurality of photoelectric converters are arranged in horizontal and vertical directions and which collectively construct one frame, a plurality of horizontal transfer units formed in one-to-one correspondence with the plurality of image sensing regions and each comprising a plurality of transfer stages, a plurality of output terminals formed in one-to-one correspondence with the plurality of horizontal transfer units, and a processor adapted to reduce offset differences between a plurality of image signals output from the plurality of output terminals, on the basis of dummy image signals output from the plurality of output terminals, wherein the dummy output signal is obtained by performing idle transfer in the plurality of horizontal transfer units.

In a preferred embodiment, the processor corrects the gains of the plurality of image signals whose offset differences are reduced on the basis of the plurality of dummy image signals.

According to the present invention, the foregoing object is also attained by providing a signal processing method of processing an image signal, comprising reducing offset differences between a plurality of image signals output from a plurality of output terminals of an image sensing unit which comprises a plurality of image sensing regions constructing one frame and the plurality of output terminals in one-to-one correspondence with the plurality of image sensing regions, and which outputs, from each of the plurality of output terminals, an image signal pertaining to image sensing in a corresponding image sensing region and a dummy image signal concerning the corresponding image sensing region, on the basis of a plurality of dummy image signals output from the plurality of output terminals, wherein the plurality of dummy image signals are independent of electric charge obtained from photoelectric converters of the image sensing unit.

According to the present invention, the foregoing object is also attained by providing a signal processing method in a signal processing apparatus comprising a plurality of image sensing regions which comprise a plurality of photoelectric converters arranged in horizontal and vertical directions and which construct one frame, a plurality of vertical transfer units for transferring signals from the plurality of photoelectric converters, a plurality of horizontal transfer units formed in one-to-one correspondence with the plurality of image sensing regions and each comprising a plurality of transfer stages, and a plurality of output terminals formed in one-to-one correspondence with the plurality of horizontal transfer units, the method comprising reducing offset differences between a plurality of image signals output from the plurality of output terminals on the basis of a dummy image signal obtained by performing idle transfer in the plurality of horizontal transfer units and output from the plurality of output terminals.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 18 is a view showing an example of an image sensing device which outputs image signals of a plurality of regions in parallel by dividing one frame into these regions;

FIG. 19 is a block diagram of a conventional signal processing circuit for processing output signals from an image sensing device of the type shown in FIG. 18.

DETAILED DESCRIPTION OF THE PREFERRED EMBODIMENTS

Preferred embodiments of the present invention will now be described in detail in accordance with the accompanying drawings.

First Embodiment

Figure 1:
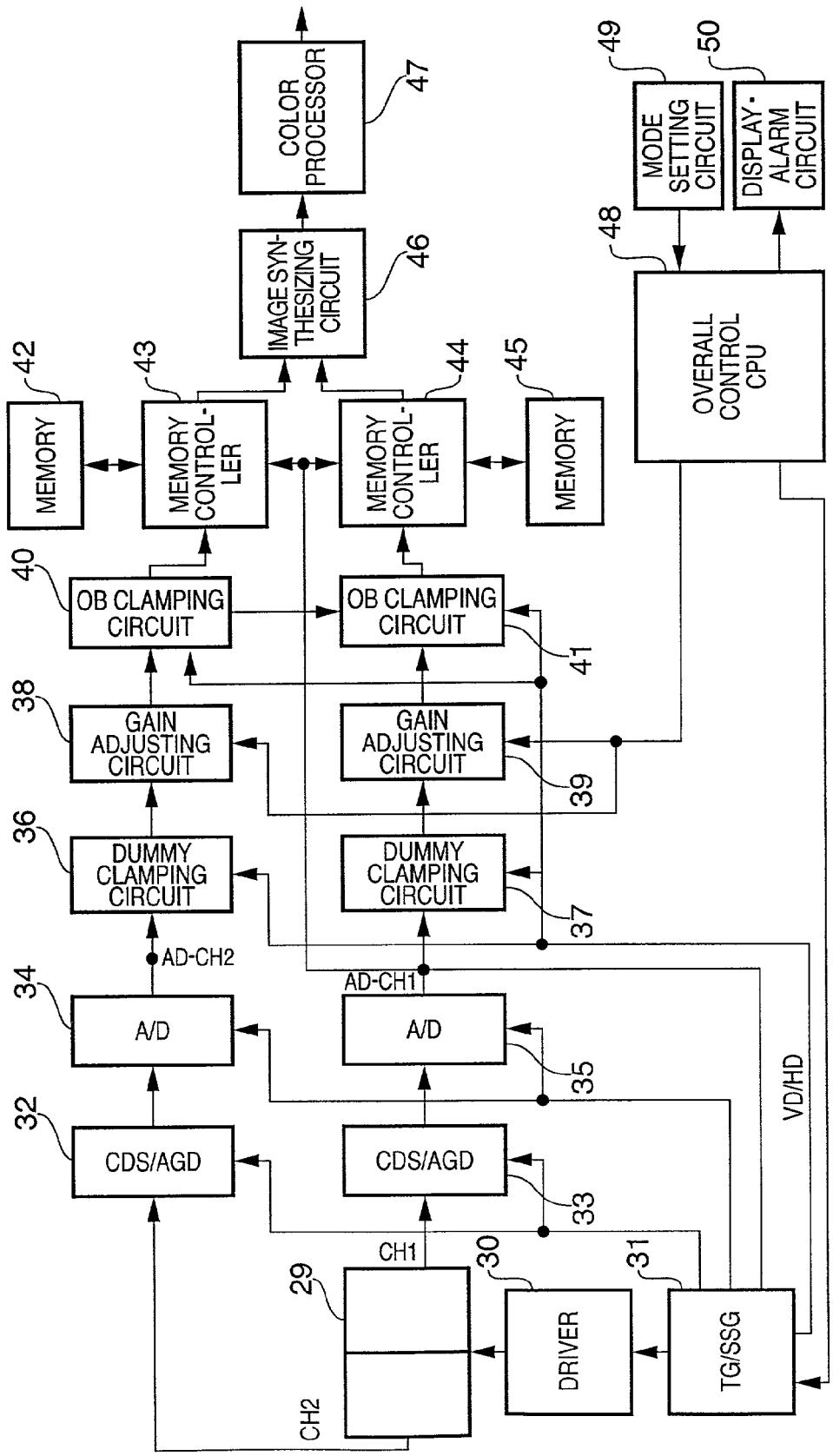
FIG. 1 is a block diagram schematically showing a hardware configuration of an image sensing apparatus including a signal processing circuit according to a first embodiment of the present invention.

FIG. 1 is a block diagram schematically showing the hardware configuration of an image sensing apparatus (e.g., a digital camera) including a signal processing circuit according to a preferred embodiment of the present invention. In this embodiment, as an image sensing device for outputting image signals of a plurality of regions in parallel by dividing one frame into these regions, a CCD 29 which outputs image signals of two regions in parallel by dividing one frame into these two regions is used. This CCD 29 has two outputs (output terminals, output signals) CH1 and CH2 corresponding to the two regions. More specifically, the CCD 29 is driven by a driver 30 to operate at a predetermined frequency, and outputs left and right image signals separately by vertically dividing the whole frame as shown in FIG. 18.

An optical image of an object is formed on the image sensing surface of the CCD 29 by a main optical system (not shown). This optical image is photoelectrically converted by a plurality of photodiodes (photoelectric converters) 59 two-dimensionally arranged on the image sensing surface. The photoelectrically converted image is longitudinally (vertically) transferred to two, left and right horizontal transfer CCDs (HCCDs) 57 and 58 via vertical transfer CCDs (VCCD) 60. The image is further transferred laterally (horizontally) (to the left and to the right) by the HCCDs 57 and 58 and output via output amplifiers 55 and 56.

In the CCD 29 having the configuration shown in FIG. 18, the HCCDs 57 and 58 have extra stages in addition to stages equal in number to pixels in the lateral direction of the VCCDs 60 (or the photodiode unit 59). More specifically, the CCD 29 of this embodiment has extra stages 57d and 58d between HCCDs 57V and 58V to which electric charge (image signal) is directly transferred from the VCCDs 60, and the output amplifiers 55 and 56, respectively. The HCCDs 58 and 59 transfer dummy signals by the same number as the number of the HCCDs 57d and 58d. That is, in this CCD 29, the HCCDs 57 and 58 are driven after electric charge is transferred to these HCCDs 57 and 58, thereby outputting dummy pixel levels (levels of charge (signals) remaining in the HCCDs 57 and 58 before the transfer of electric charge from the VCCDs 60 is started) independent of the output from the photodiode 59, by the same number as the number of stages of the extra HCCDs 57d and 58d.

Referring back to FIG. 1, a TG/SSG circuit 31 is a timing generator for outputting a vertical sync signal VD and a horizontal sync signal HD. These vertical and horizontal sync signals VD and HD are supplied to the driver 30, CDS/AGC circuits 32 and 33, and A/D conversion circuits 34 and 35.

Figure 2:
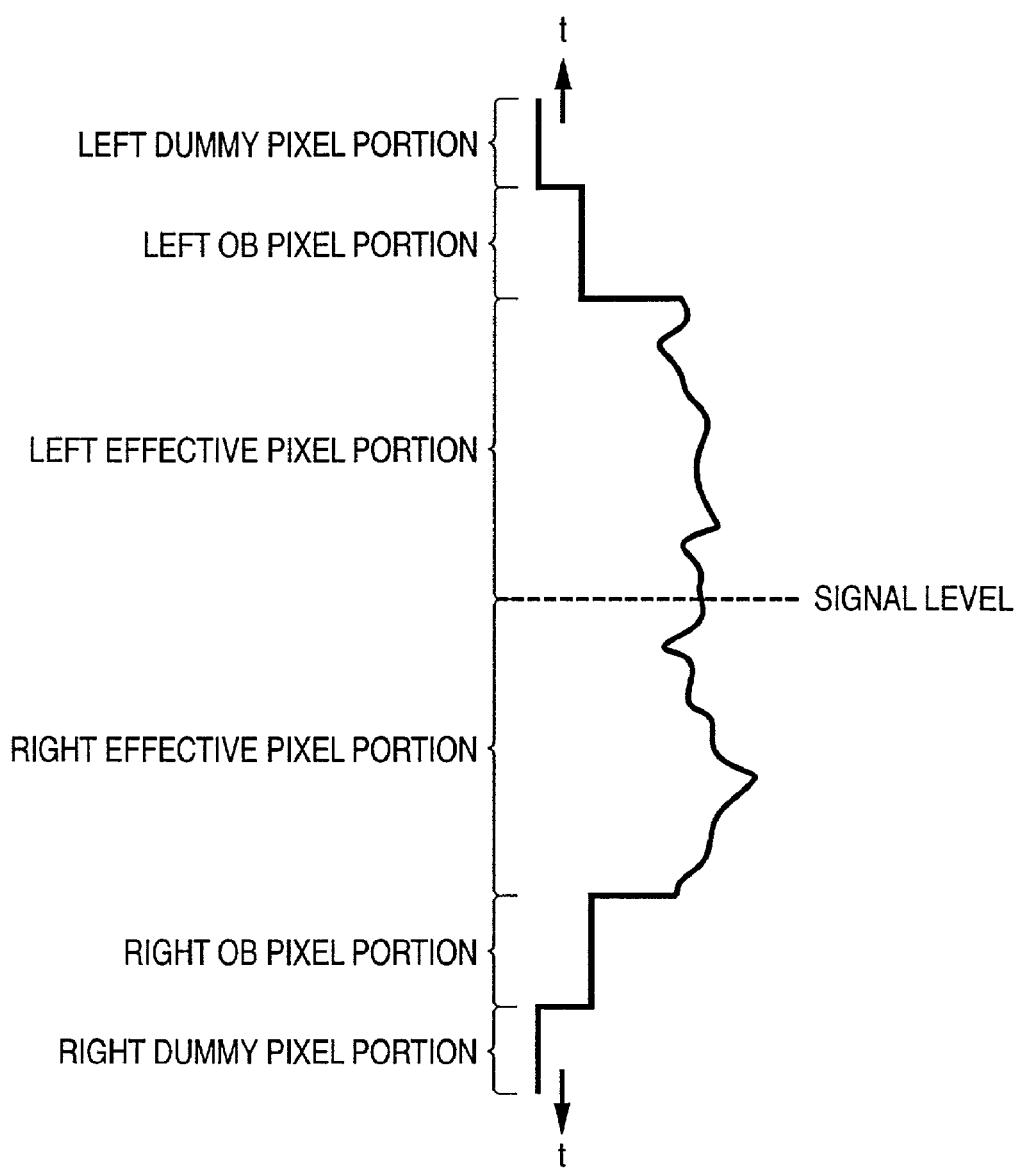
FIG. 2 is a view showing a practical example of an output signal from an image sensing device according to the first embodiment of the present invention.

As shown in FIG. 2, output image signals corresponding to the right-half and the left-half of the frame of the CCD 29 contain outputs of effective pixel portions (left and right effective pixel portions), outputs of OB pixel portions (left and right OB pixel portions), and outputs of dummy pixel portions (left and right dummy pixel portions), as outputs of one lateral line. The left and right dummy pixel portions correspond to the extra HCCDs 57*d* and 58*d* described above. The amplifier 55 of the CCD 29 outputs signals of the left dummy pixel portion, left OB pixel portion, and left effective pixel portion in this order. The amplifier 56 outputs signals of the right dummy pixel portion, right OB pixel portion, and right effective pixel portion in this order.

The image output from the right-half frame of the CCD 29 is supplied to the CDS/AGC circuit 33 from the terminal CH1. Since this terminal CH1 is AC-coupled to the CDS/AGC circuit 33, a DC component of the signal is removed. In the CDS/AGC circuit 33, a CDS circuit performs correlated double sampling and the like on the supplied signal of the right-half frame to thereby remove reset noise and the like contained in the output signal from the CCD 29. Also, an AGC circuit amplifies the output signal to a predetermined signal level. The signal amplified by this AGC circuit is supplied to the A/D conversion circuit 35 where the signal is converted into a digital signal to obtain a signal AD-CH1.

Similarly, the image output from the left-half frame of the CCD 29 is supplied from the terminal CH2 to the CDS/AGC circuit 32, and a DC component of the signal is removed. In this CDS/AGC circuit 32, a CDS circuit performs correlated double sampling and the like on the supplied signal of the left-half frame to thereby remove reset noise and the like contained in the output signal from the CCD 29. Also, an AGC circuit amplifies the output signal to a predetermined signal level. The signal amplified by this AGC circuit is supplied to the A/D conversion circuit 34 where the signal is converted into a digital signal to obtain a signal AD-CH2.

The signal AD-CH1 is then supplied to a dummy clamping circuit 37. The dummy clamping circuit 37 calculates the average value of the signal values of a predetermined number of pixels of the right dummy pixel portion sequentially output line-by-line, and subtracts the average value from each pixel value of an image signal of one line subsequently output from the right-half frame. That is, the dummy clamping circuit 37 performs a clamping process for shifting the level of the whole one line, so as to correct the signal level (dummy pixel level) of the right dummy pixel portion to a predetermined value (in this case, zero). The clamping process need not be performed by subtracting, from each pixel value of an image signal of each line, the average value of the signal values corresponding to that line of the right dummy pixel portion. For example, it is possible to subtract the average value of the signal values corresponding to a plurality of lines of the right dummy pixel portion, or subtract the intermediate value (median) of the signal values corresponding to one or a plurality of lines of the right dummy pixel portion. Some other method can also be used.

Alternatively, the CDS/AGC circuit 33 or the AD conversion circuit 35 can incorporate a clamping circuit and perform clamping on the basis of the dummy pixel portion by using the built-in clamping circuit alone.

By performing the clamping process for all lines, it is possible to cancel longitudinal (vertical) shading generated in analog circuits, and correct the level of an image signal of the right-half frame so as to hold the dummy pixel level constant on all lines.

Likewise, the signal AD-CH2 is supplied to a dummy clamping circuit 36. The dummy clamping circuit 36 calculates the average value of the signal values of a predetermined number of pixels of the left dummy pixel portion sequentially output line-by-line, and subtracts the average value from each pixel value of an image signal of one line subsequently output from the left-half frame. That is, the dummy clamping circuit 36 performs a clamping process for shifting the level of the whole line, so as to correct the signal level (dummy pixel level) of the left dummy pixel portion to the same level as the dummy pixel level of the right-half frame. The clamping process need not be performed by subtracting, from each pixel value of an image signal of each line, the average value of the signal values corresponding to that line of the left dummy pixel portion. For example, it is possible to subtract the average value of the signal values corresponding to a plurality of lines of the right dummy pixel portion, or subtract the intermediate value (median) of the signal values corresponding to one or a plurality of lines of the right dummy pixel portion. Some other method can also be used.

Alternatively, the CDS/AGC circuit 32 or the AD conversion circuit 34 can incorporate a clamping circuit and perform clamping on the basis of the dummy pixel portion by using the built-in clamping circuit alone.

By performing the clamping process for all lines, it is possible to cancel longitudinal (vertical) shading generated in analog circuits, and correct the level of an image signal of the left-half frame so as to hold the dummy pixel level constant on all lines.

In this embodiment as described above, the clamping process is separately performed for the left and right regions not on the basis of the pixel values in the OB pixel portions, but on the basis of the pixel values in the left and right dummy pixel portions. For example, even if dark currents in the OB pixel portions in the left and right regions are different, an offset difference between image signals in the left and right regions can be removed regardless of the dark current difference.

The image signals thus processed by the dummy clamping circuits 36 and 37 are supplied to gain adjusting circuits 38 and 39. To correct a gain difference between the image signals, of the left and right regions, generated by the amplifiers of the CCD 29, the CDS/AGC circuits 32 and 33, and the AD conversion circuits 34 and 35, these gain adjusting circuits 38 and 39 multiply the output image signals from the dummy clamping circuits 36 and 37 by a gain correction value provided by the overall processing CPU 48, thereby removing the gain difference between the image signals of the left and right regions.

Methods of obtaining a gain correction value will be explained below.

In the first method, a gain value is obtained in advance of shipment from the factory, and the gain adjusting circuits 38 and 39 perform gain correction by using this value (fixed value).

The second method is as follows.

First, before main image sensing is performed (before the user photographs an object image which he or she wants), calibration image sensing is performed to obtain a calibration image.

This calibration image may be obtained by, e.g., sensing a white image by the user. Alternatively, a light source such as an LED is provided in the shutter, and this LED is turned on with the shutter closed and sense an image before main image sensing is performed, thereby obtaining a calibration image.

After that, this calibration image is clamped by the dummy clamping circuits 36 and 37 in the same manner as described above.

An overall control CPU 48 compares calibration images (output from different output terminals) clamped by the dummy clamping circuits 36 and 37. In accordance with the comparison result, a gain correction value is calculated.

The third method will be explained last.

In the above second method, a gain correction value is obtained by comparing the two calibration images. In this third method, however, no calibration image sensing is performed, and the overall control CPU 48 compares images (output from different output terminals) obtained by main image sensing. In accordance with the comparison result, a gain correction value is calculated.

In the second and third methods, a gain correction value is calculated whenever image sensing is performed. Accordingly, images having higher quality can be obtained.

By performing the dummy clamping process and the gain correction process as described above, the offset difference and the gain difference between the image signals of the left and right regions of the CCD 29 are removed. Therefore, when these signals are synthesized by an image synthesizing circuit 46, the boundary between the two regions is inconspicuous. However, if these signals are directly output, the black level has not been adjusted to a predetermined value, so black becomes too bright or too dark in the output image.

To prevent this, the two gain-corrected signals are supplied to OB clamping circuits 40 and 41 and clamped on the basis of the pixel values in the OB pixel portions. As shown in FIG. 2, these OB pixel portions are formed in the left and right regions. However, if the OB clamping process is separately performed for the left and right image signals on the basis of the pixel values in the left and right OB pixel portions, the offset difference once removed appears between the two regions.

To solve this problem, in the first embodiment a DC component is regenerated by clamping the left and right image signals by a common value on the basis of the pixel values in one of the left and right OB pixel portions. For example, the average value of the pixel values of a predetermined number of pixels, contained in the output signal from the left-half frame, of the OB pixel portion is calculated. The OB clamping circuit 40 subtracts this average value from each pixel value of an image signal of one line in the left-half frame. At the same time, this average value is supplied to the OB clamping circuit 41 and subtracted from each pixel value of an image signal of one line in the right-half frame. This processing is executed for all lines.

Note that the present invention is not limited to the pixel value in one of the left and right OB pixel portions. As an example, the average of both the left and right pixel values can also be used.

Subsequently, these image signals are written in frame memories 42 and 45 via memory controllers 43 and 44. After that, the image synthesizing circuit 46 synthesizes the two image signals to generate an image signal of one frame image. A color processing circuit 47 in the next stage performs predetermined color processing (e.g., color interpolation and gamma conversion) on the generated image signal.

Second Embodiment

Figure 3:
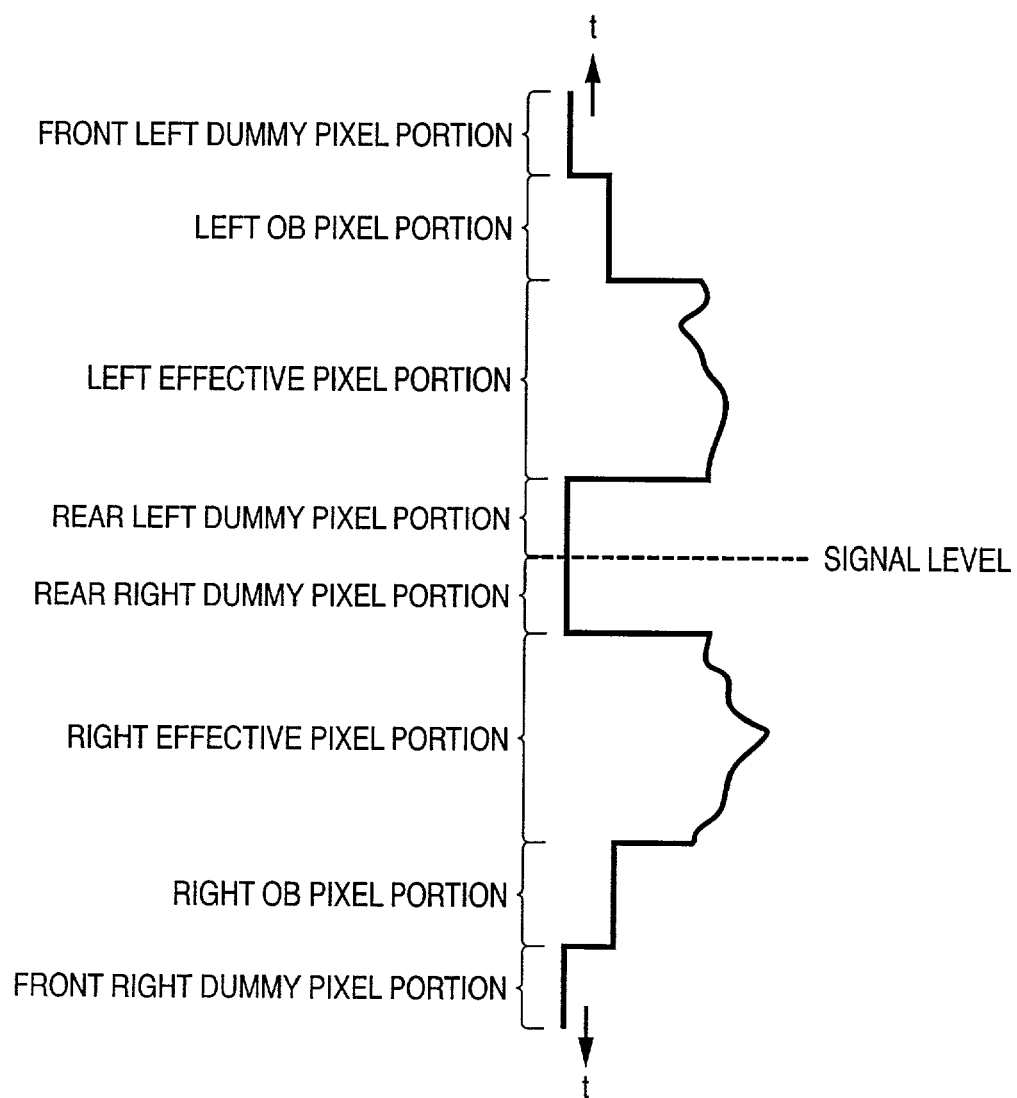
FIG. 3 is a view showing a practical example of an output signal from an image sensing device according to a second embodiment of the present invention.

The second embodiment of the present invention will be described below. When an image sensing device 29 having a plurality of output terminals is a CCD as shown in FIG. 18 and HCCDs 57 and 58 keep transferring signals exceeding the number of stages of these HCCDs 57 and 58, as shown in FIG. 3, after charge signals of left and right dummy pixel portions, left and right OB pixel portions, and left and right effective pixel portions are output in this order, charge signals of left and right dummy pixel portions containing signal components of only the HCCDs 57 and 58 (i.e., not containing electric charge transferred from a VCCDs 60) are output. The left and right dummy pixel portions from which charge signals are output later will be called rear left and right dummy pixel portions. Further, the left and right dummy pixel portions output first will be called front left and right dummy pixel portions.

The charge signals output from the front left and right dummy pixel portions and the charge signals output from the rear left and right dummy pixel portions contain components of only the HCCDs 57 and 58 independent of charge generated by photodiodes 59, so these signals are supposed to have the same level. However, if signals are varied in an analog manner by disturbance or the like in amplifiers 55 and 56, CDS/AGC circuits 53 and 54, and A/D conversion circuits 55 and 56 of the CCD 29, the above-mentioned signals do not have the same level. In this case, since signals of the rear left and right dummy pixel portions are output immediately after signals of the boundary portion between the left and right regions of the effective pixel portion is output, so their output timings are close to the output timing of the boundary portion between the left and right regions of the effective pixel portion. Accordingly, these rear left and right dummy pixel portions are less influenced by level fluctuations of signals in analog circuits than the front dummy pixel portions. This allows the signals of the rear left and right dummy pixel portions to have high correlation with the signals of the effective pixel portions, particularly, the signals of the boundary portion between the left and right regions of the effective pixel portion.

As in the first embodiment, therefore, output signals from the left and right regions of the CCD 29 are separately input to CDS/AGC circuits 33 and 32 and A/D conversion circuits 35 and 34 to obtain digital signals AD-CH1 and AD-CH2, respectively. After that, dummy clamping circuits 37 and 36 shown in FIG. 1 perform clamping on the basis of the signal values of the rear dummy pixel portions. This processing is also the same as in the first embodiment. That is, the average values of the signal values of a predetermined number of pixels of the rear left and right dummy pixel portions sequentially output line-by-line are calculated. The average values are subtracted from pixel values of image signals of one line subsequently output from the left-half and right-half frames. The level of the whole one line is shifted so as to set the signal levels of the rear left and right dummy pixel portions to a predetermined value. The clamping process need not be performed by subtracting, from each pixel value of an image signal of each line, the average values of the signal values corresponding to that line of the left and right dummy pixel portions. For example, it is possible to subtract the average values of the signal values corresponding to a plurality of lines of the left and right dummy pixel portions, or subtract the intermediate values (medians) of the signal values corresponding to one or a plurality of lines of the left and right dummy pixel portions. Some other method can also be used.

Alternatively, the CDS/AGC circuits 32 and 33 or the AD conversion circuits 34 and 35 can incorporate a clamping circuit and perform clamping on the basis of the left and right dummy pixel portions by using the built-in clamping circuit alone.

By performing this clamping process for all lines, it is possible to cancel longitudinal (vertical) shading generated in analog circuits, and correct the image levels of the left-half and right-half frames so as to hold the dummy pixel level constant.

In addition, as in the first embodiment, gain adjusting circuits 38 and 39 correct a gain difference between the left and right outputs. After that, OB clamping circuits 40 and 41 clamp these signals by the same OB value to reproduce a DC component. An image synthesizing circuit 46 synthesizes the left and right image signals to generate an image signal of one image, and color processing is performed.

As described above, the clamping process is executed on the basis of the signal values of the rear dummy pixel portions. Consequently, even if signals fluctuate in an analog manner in the CCD amplifiers, CDS/AGC circuits, and A/D conversion circuits, an offset difference between the image signals in the left and right regions can be well removed. In this embodiment, items other than those described above are the same as in the first embodiment.

Third Embodiment

Figure 4:
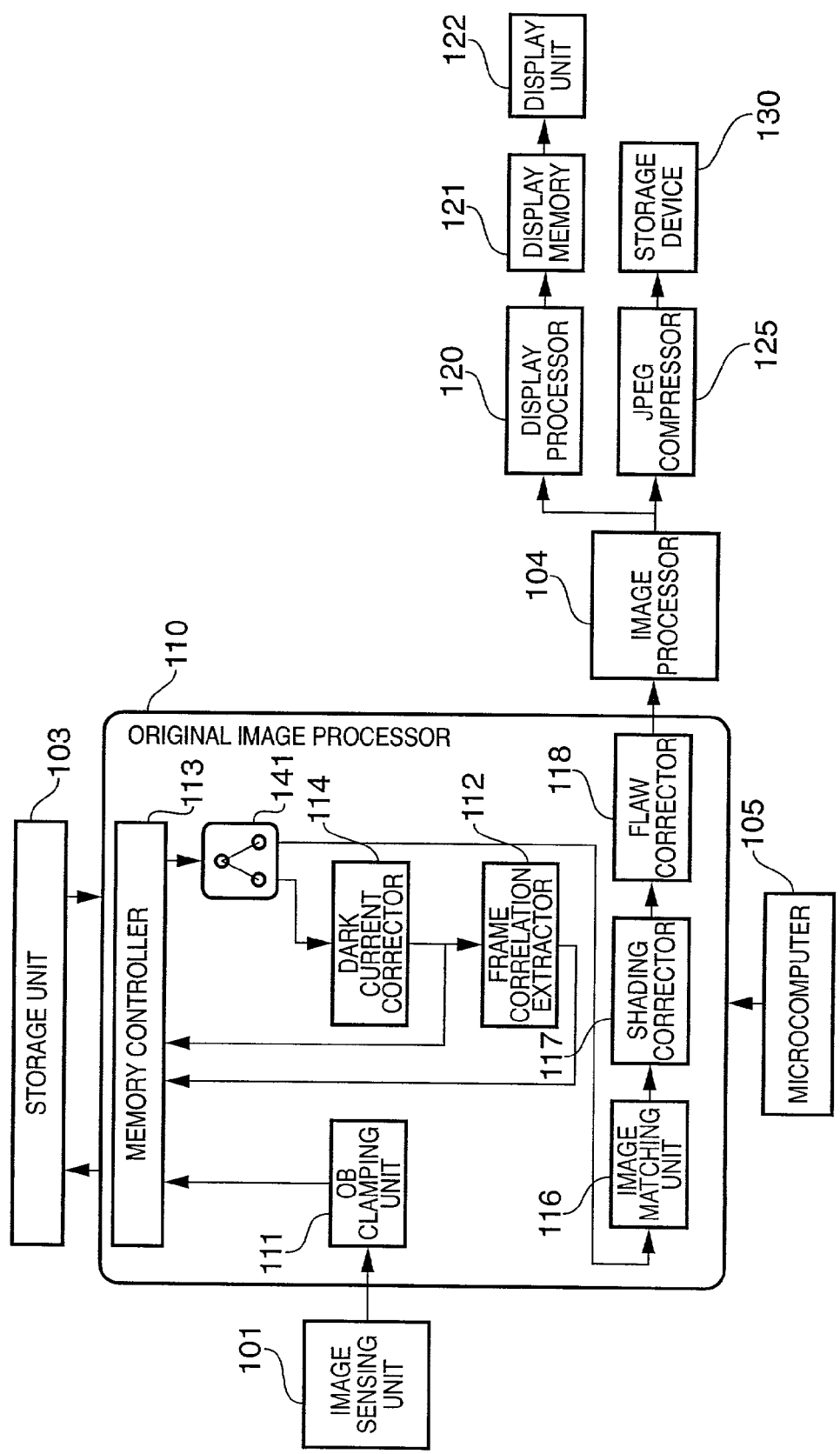
FIG. 4 is a schematic block diagram showing the arrangement of an image sensing apparatus according to a third embodiment of the present invention.

FIG. 4 is a schematic block diagram showing the arrangement of an image sensing apparatus such as a digital camera according to the third embodiment of the present invention.

As shown in FIG. 4, the image sensing apparatus includes an image sensing unit 101 such as a CCD area sensor, a microcomputer (PRS) 105 for controlling the overall image processing, an original image processor 110 for processing an image signal from the image sensing unit 101, an image processor 104 for receiving the output from the original image processor 110 and performing processing such as white balance correction and color interpolation, and a storage unit 103 having a nonvolatile storage device for saving image data of a plurality of images. The image sensing apparatus further includes a display processor 120 for displaying processed image data, a display memory 121, a display unit 122 such as an LCD, and a JPEG compressor 125 and storage device 130 for storing processed data.

The microcomputer 105 is a one-chip computer in which a CPU (Central Processing Unit), RAM, ROM, EEPROM (Electrically Erasable Programmable ROM), input/output ports, and the like are arranged.

This microcomputer 105 performs a series of operations on the basis of a sequence program stored in the ROM. The characteristic feature of the present invention is the original image processor 110. Therefore, an arrow is added in FIG. 4 to clearly indicate that this original image processor 110 is under the control of the microcomputer 105. However, the remaining portions are also controlled by the microcomputer 105.

In the image sensing unit 101, an image of a bundle of rays from an object is formed on an image sensing device via an optical system (not shown). The image sensing device photoelectrically converts the object image into an electrical signal. The electrical signal is further converted into a digital signal and output to the original image processor 110. Details of this image sensing unit 101 will be described later with reference to FIG. 6.

The original image processor 110 receives the sensed image signal output from the image sensing unit 101. As a preparation for dark correction by an OB clamping unit 111, the original image processor 110 extracts pixel data of a light-shielded portion (optical black) and temporarily stores the data in a buffer memory of the storage unit 103. This buffer memory has a capacity capable of storing sensed image data, read out from the image sensing device, of a plurality of frame images with image data of a frame image as a unit.

When an image sensing operation is performed a plurality of number of times within a short time period, i.e., when continuous image sensing is to be performed, the buffer memory functions to eliminate or minimize the influence of the processing speed of the image processor 104 and its subsequent units. In the third embodiment, the buffer memory is also imparted a function of storing an image sensing device dark output used to correct the dark current of pixel data.

A memory controller 113 controls data inputting and outputting between the original image processor 110 and the storage unit 103.

Pixel data once stored in the storage unit 103 is loaded into the original image processor 110 and subjected to signal processing by a dark current corrector 114, a frame correlation extractor 112, an image matching unit 116, a shading corrector 117, a flaw corrector 118, and the like. A switch 141 selectively supplies data in accordance with whether to perform frame correlation extraction or signal processing for outputting the data to the image processor 104.

The signal processing procedure in the original image processor 110 will be described in detail later with respect to FIG. 10.

For the pixel data processed by the original image processor 110, the image processor 104 performs a series of image processing for so-called picture formation, e.g., white balance correction, gamma correction, color interpolation, and color correction, and outputs R, G, B component signals. Therefore, to perform color interpolation, the output data amount from the image processor 104 is increased to be an integral multiple of the output data amount from the original image processor 110.

For example, when the image sensing device of the image sensing unit 101 is covered with color filters of the Bayer arrangement, lines for alternately outputting R (Red) and G (Green) signals and lines for alternately outputting G and B (Blue) signals are arranged on every other horizontal line. The output data from the original image processor 110 also has the order of the Bayer arrangement. Accordingly, when the image processor 104 performs color interpolation for input data and outputs R, G, and B data for each pixel, the image data amount is three times that of the input data. This is conceptually shown in FIG. 5.

The output from the image processor 104 is subjected to signal processing, including filter processing, performed by the display processor 120 to reduce the image size, so that the size becomes an optimum size to be displayed on a display unit 122 such as an LCD of the image sensing apparatus. After that, the processed data is stored in the display memory 121. That is, the data is stored for each color component R, G, or B, and interfacing with a driver of the LCD display unit 122 of the camera is also done by R, G, and B. Outputting is performed line-by-line similar to inputting.

The JPEG compressor 125 comprises a YUV converter and a JPEG encoder. The YUV converter converts the input R, G, and B image data from the image processor 104 into luminance and color difference components, and the JPEB encoder performs image compression. That is, the JPEG encoder compresses the input image data by JPEG encoding. In this embodiment, Discrete Cosine Transform (DCT) and Huffman transform are performed. The JPEG encoder also has a function of converting the luminance signal and color difference signals from raster scan to zigzag scan, in order to perform DCT, by using a minimum unit of 8 (longitudinal)× 16 (lateral) pixels for the luminance signal and a minimum unit of 8×8 pixels for the color difference signals.

The compressed data is sequentially stored in the subsequent storage device 130. The above encoding process is repeated for one frame of the sensed image data from the image sensing unit 101. Before or after this JPEG encoding, the microcomputer 105 generates, where necessary, a header or footer such as image sensing date/time information in an arbitrary form, and stores this header or footer together with the image data compressed by encoding into the storage device 130.

More specifically, image data having two different image sizes are stored in the storage device 130 on the basis of the same sensed image data. The first image data is not subjected to image reduction by an internal image reducing unit of the image processor 104. The second image data is subjected to this image reduction by the internal image reducing unit of the image processor 104. The first image data is generated as image data indicating the sensed image. The second image data is generated to be handled as management information when image data such as thumbnail is to be edited or for confirmation. Although the first and second image data are managed as independent files, they are related to each other.

Also, values such as the compression ratio necessary for JPEG encoding and transformation reference data required for the compression ratio are set by the microcomputer 105 when the shutter of the image sensing apparatus is pressed.

The storage device 130 has a volatile storage device having a relatively high write rate with which a plurality of image data can be saved, and a detachable nonvolatile storage device having a relatively low write rate. The output from the JPEG compressor 125 is first stored in the volatile storage device. That is, two image data representing images of different image sizes generated from the same sensed image data are stored. After that, these image data are sequentially stored in the nonvolatile storage device during intervals between operations of the image sensing apparatus.

The nonvolatile storage device is detachable from the image sensing apparatus. Therefore, the nonvolatile storage device may be attached to the image sensing apparatus to write data of one or a plurality of frame images from the volatile storage device, thereafter, removed from the image sensing apparatus, then attached to another system capable of reading data of the data format of the image sensing apparatus. This allows the stored data to be reproduced, edited, and saved. In the storage device 130, both the first and second image data described above are managed in a format meeting the above purpose.

Figure 6:
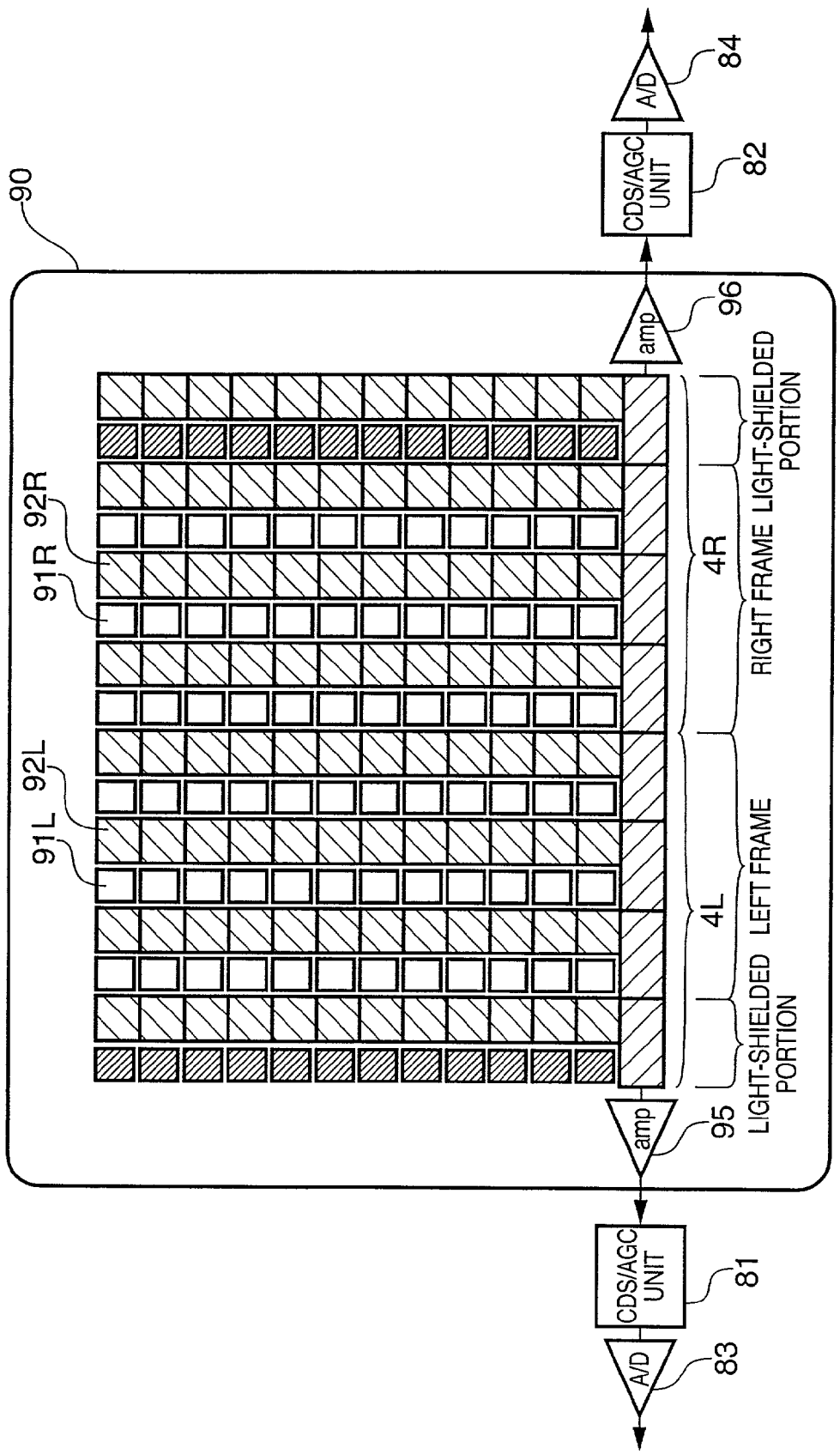
FIG. 6 is a view showing the arrangement of an image sensing unit shown in FIG. 4.

FIG. 6 is a schematic view showing the internal arrangement of the image sensing unit 101 shown in FIG. 4. In FIG. 6, reference numeral 90 denotes an image sensing device such as a CCD area sensor; 81 and 82, well-known CDS (Correlation Double Sampling)/AGC (Automatic Gain Control) units; and 83 and 84, well-known A/D converters. This image sensing unit 101 also includes a sensor driver (not shown) for driving the image sensing device 90. With this arrangement, the image sensing unit 101 performs analog processing suited to the readout photoelectric conversion output, converts the analog signal into a digital signal, and outputs the digital signal.

The image sensing device 90 is a known image sensing device called a Bayer arrangement type CCD. Reference symbols 91L and 91R denote photoelectric conversion elements present in the left- and right-half regions, respectively, of the frame; and 92L and 92R, vertical transfer CCDs (VCCDs) present in the left- and right-half regions, respectively, of the frame. A photoelectric conversion element and a VCCD in each stage make a pair, and an image sensing region is formed by two-dimensionally arranging a plurality of such pairs. An image is sensed by converting a bundle of rays from an object into electric charge by the photoelectric conversion elements. Reference symbol 4L denotes a horizontal CCD (HCCD) for horizontally transferring electric charge sequentially transferred from the VCCDs 92L; and 4R, an HCCD for horizontally transferring electric charge sequentially transferred from the VCCDs 92R.

The light receiving surface of the image sensing device 90 forming the image sensing region is covered with primary-color filters of R, G, and B. The G filters are arranged checkerwise, and the R and B filters are arranged every other line between these G filters (Bayer arrangement). Pixels are arranged in the form of a tetragonal lattice. This facilitates operations after an image is loaded.

Electric charges generated in the photoelectric conversion elements 91L are transferred to the VCCDs 92L, and then sequentially transferred vertically toward the HCCD 4L by horizontal lines. After that, the electric charges are transferred in a direction B by the HCCD 4L, and converted from the electric charges into a voltage signal by a charge-voltage conversion amplifier 95. The voltage signal is processed by the CDS/AGC unit 81 and further converted into digital data by the A/D converter 83. After that, the digital data is output to the original image processor 110 shown in FIG. 4.

Similarly, electric charges generated in the photoelectric conversion elements 91R are transferred to the VCCDs 92R, and then sequentially transferred vertically toward the HCCD 4R by horizontal line. After that, the electric charges are transferred in a direction A by the HCCD 4R, and converted from the electric charges into a voltage signal by a charge-voltage conversion amplifier 96. The voltage signal is processed by the CDS/AGC unit 82 and further converted into digital data by the A/D converter 84. After that, the digital data is output to the original image processor 110 shown in FIG. 4. In this manner, the sensed image data is separately output in the left and right regions.

The VCCDs 92L and 92R, the HCCDs 4L and 4R, photoelectric conversion elements in a light-receiving unit, and photoelectric conversion elements in OB units which are regions shielded from light, all of which construct the image sensing device 90, are actually larger in number than those shown in FIG. 6. For example, in FIG. 6 one photoelectric conversion element at each of the right and left ends in each horizontal line is shown as the OB portion. However, a plurality of photoelectric conversion elements are actually arranged at each end to configure the OB portion.

Figure 7:
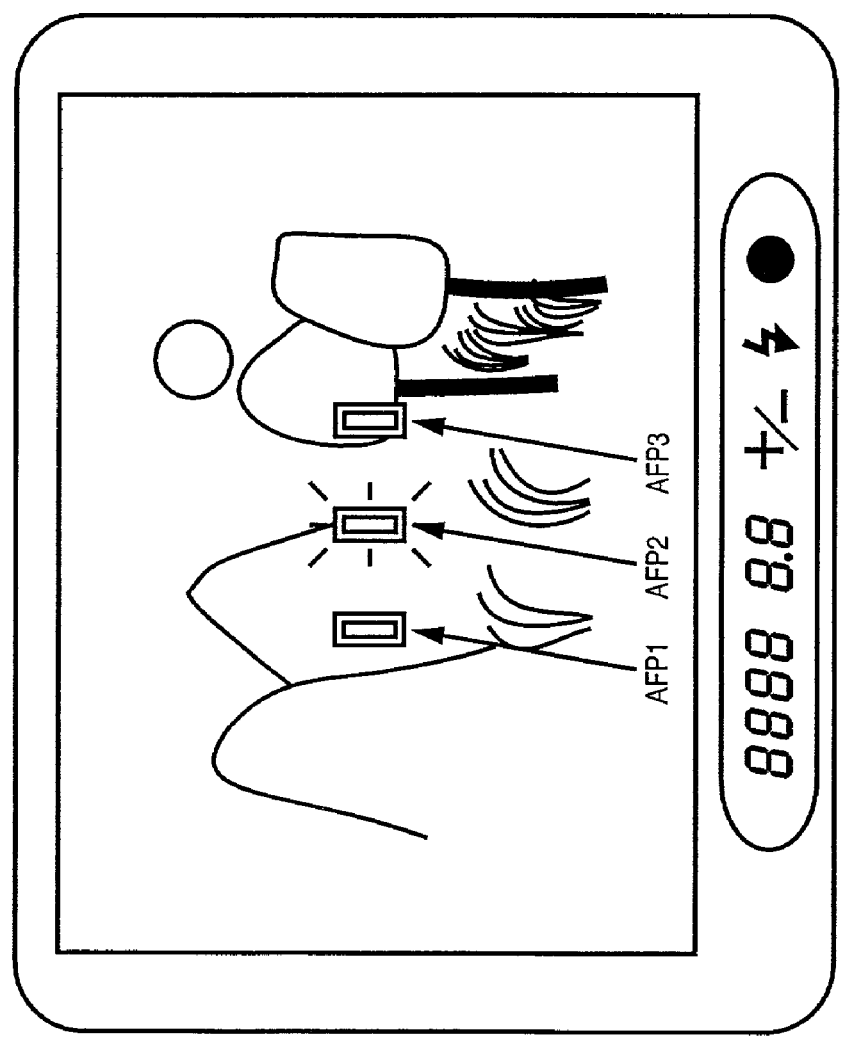
FIG. 7 is a view showing an image seen in the finder of the image sensing apparatus according to the third embodiment of the present invention.

FIG. 7 shows an image in the finder viewed from a camera eyepiece (not shown). Reference symbols AFP1 to AFP3 denote three distance measurement points, representing a state in which focusing is performed at the distance measurement point AFP2. Also, indicators in the lower end of FIG. 7 indicate the set states of the camera, e.g., the shutter speed and the determination of an in-focus state in focusing. For the sake of explanation, all these indicators are turned on in FIG. 7. When the camera is in operation, however, these indicators are independently turned on or off in accordance with the operating state, so all the indicators are not simultaneously turned on as shown in FIG. 7. Also, when any one of the distance measurement points AFP1 to AFP3 is selected for focusing, a region surrounded by the outside and inside rectangles is lighted in red by an optical system and illuminating device (not shown) within a short time period during which the user can well confirm which point is selected.

Figure 5:
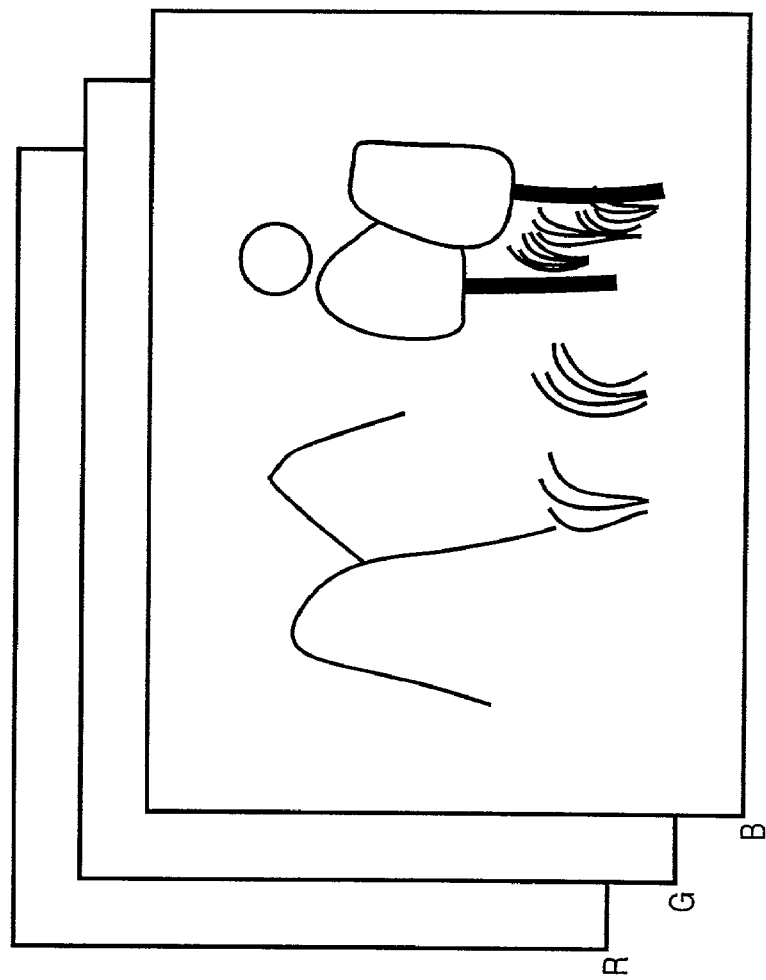
FIG. 5 is a view showing the concept of output data from an image processor according to the third embodiment of the present invention.
Figure 8:
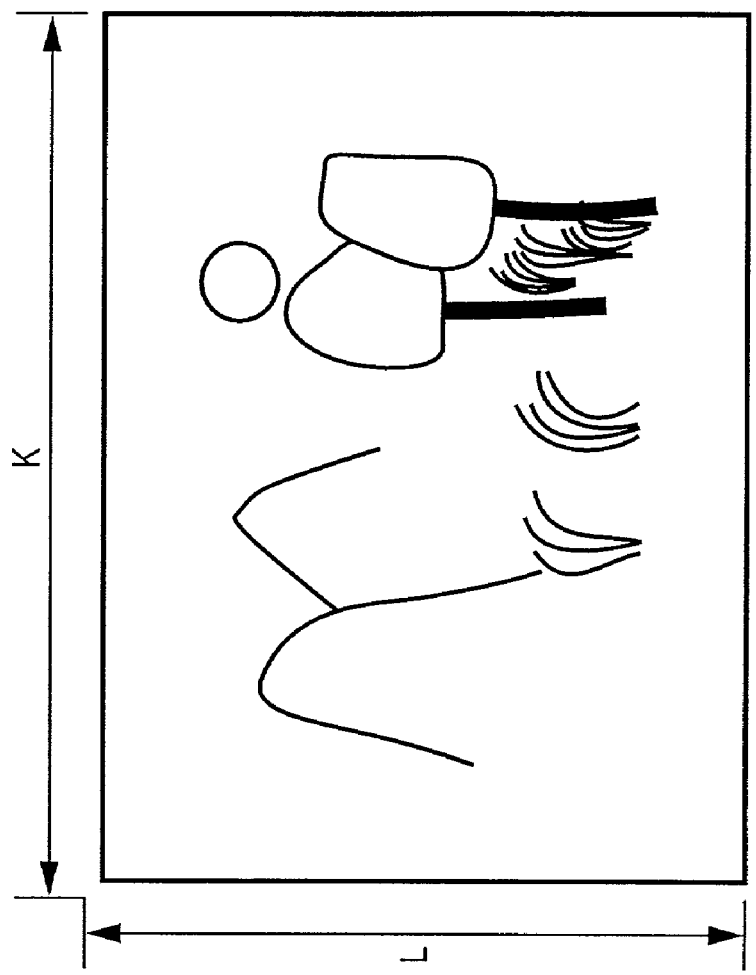
FIG. 8 is a view for explaining a light receiving unit of an image sensing device included in the image sensing unit shown in FIG. 4.

In this state, the light-receiving unit of the image sensing device included in the image sensing unit 101 has K×L pixels as shown in FIG. 8. This K×L-pixel signal shown in FIG. 8 is processed by the original image processor 110 and subjected to a series of signal processing, e.g., white balance correction, color correction, and color interpolation, performed for each of R, G, and B data by the image processor 104. Consequently, as shown in FIG. 5, output images of R, G, and B each having K×L pixels are formed. That is, the data amount from the image sensing device having K×L pixels is tripled after undergone the signal processing by the original image processor 110 and the image processor 104.

Figure 9A:
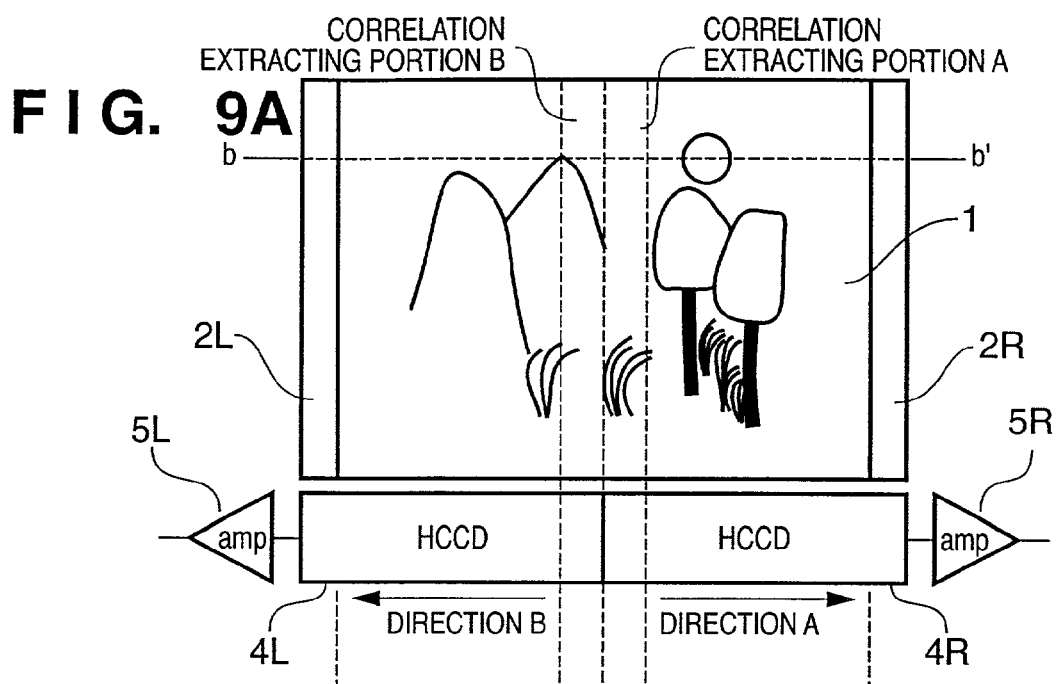
FIGS. 9A, 9B, and 9C are views for explaining a correction process according to the third embodiment of the present invention.
Figure 9B:
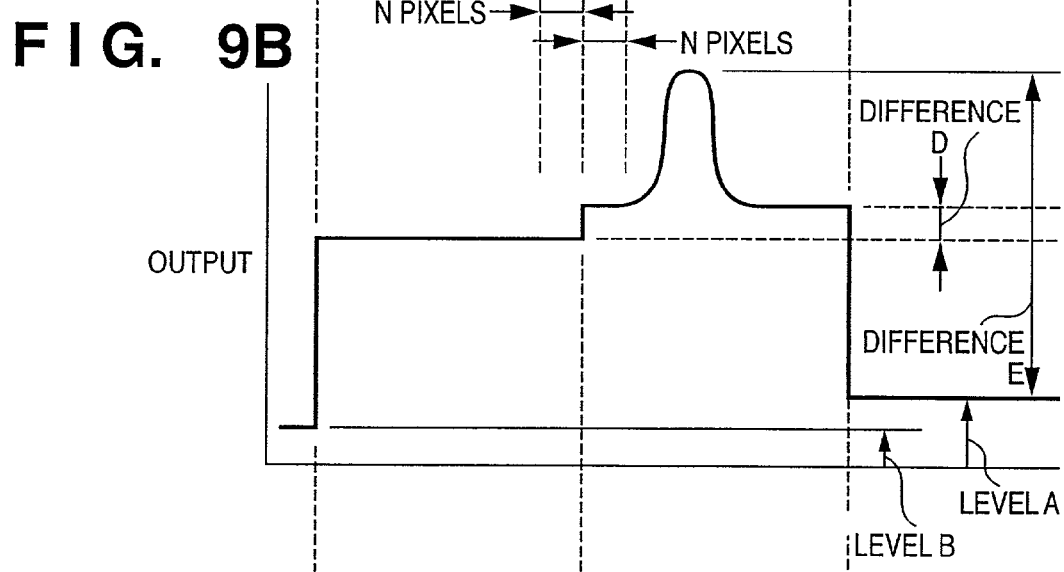
Figure 9C:
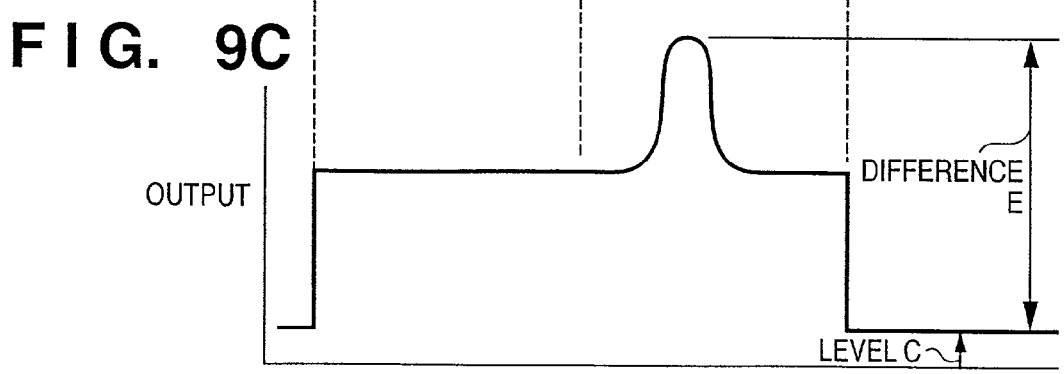

FIGS. 9A to 9C are views for explaining correction performed by calculating an output difference between the left and right frames from outputs of a plurality of photoelectric conversion elements near the boundary.

Figure 20A:
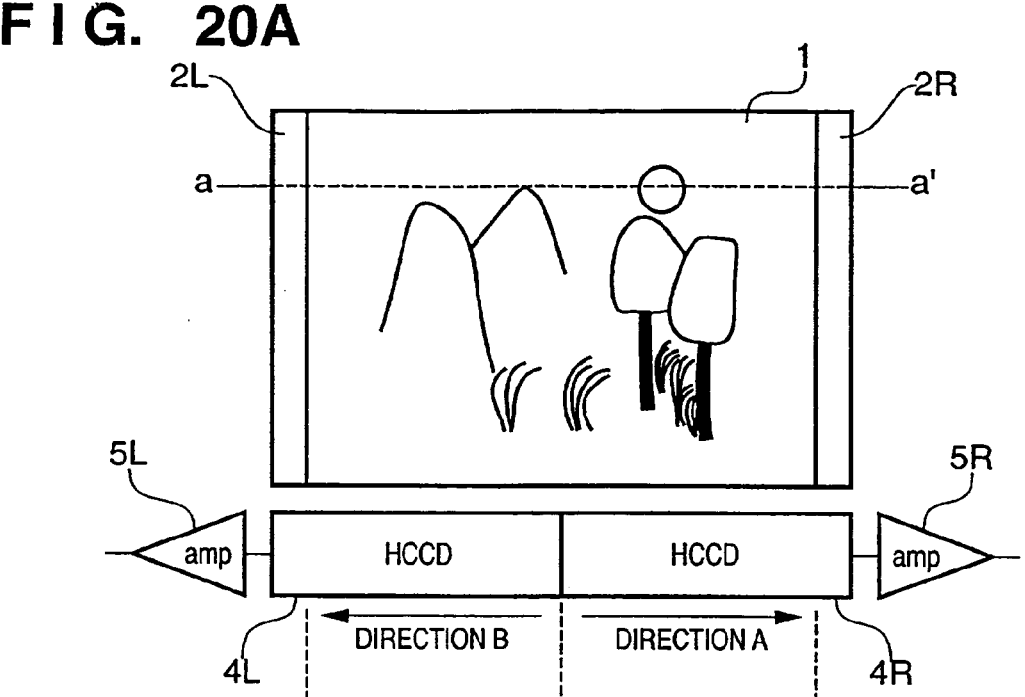
FIGS. 20A and 20B are views showing the arrangement of another conventional image sensing device.
Figure 20B:
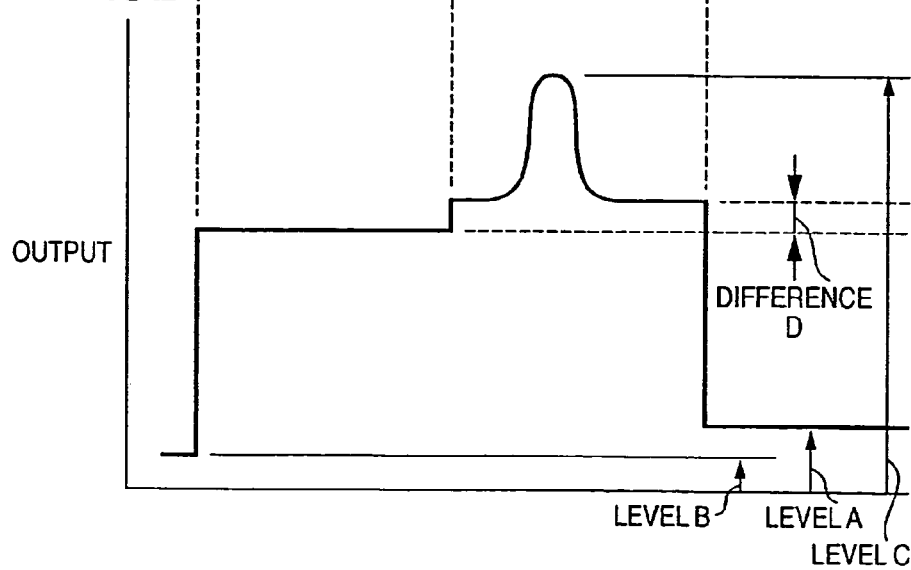

FIG. 9A is a simplified view of the image sensing device 90 shown in FIG. 6. This example shown in FIG. 9A is a landscape on a clear day in which the sun, mountains, trees, and grass are shown. Note that the same reference numerals as in the configuration shown in FIG. 20A described earlier denote the same parts in this configuration shown in FIG. 9A, and a detailed description thereof will be omitted.

FIG. 9B shows a photoelectric conversion output of one horizontal line indicated by b–b' in FIG. 9A. A level A in FIG. 9B indicates the output level of an OB unit 2R read out from the HCCD 4R, and a level B indicates the output level of an OB unit 2L read out from the HCCD 4L in FIG. 9A. A difference D indicates a level difference between the right and left frames.

Correlation extracting portions A and B shown in FIG. 9A are sensed image data regions used to calculate a correction amount for correcting the difference D. The same number (a plurality of) of photoelectric conversion element outputs are extracted from the left and right boundaries of the image sensing regions, and a correlation value is calculated to generate a correction value.

A method of calculating a correction value in the present invention will be explained below.

First, the dark current of pixel data read out from the correlation extracting portion A via the HCCD 4R and an amplifier 5R is corrected, and an average value AVGA of the corrected data is calculated. Similarly, the dark current of pixel data read out from the correlation extracting portion B via the HCCD 4L and an amplifier 5L are corrected, and an average value AVGB of the corrected data is calculated. Assuming that the number of pixels in the horizontal direction of the correlation extracting portions A and B is N, let AS(N) and BS(N) be outputs obtained by correcting the dark currents of the pixel data read out from the correlation extracting portions A and B by the HCCD 4R and the amplifier 5R, and the HCCD 4L and the amplifier 5L, respectively. That is, the average values AVGA and AVGB are calculated by $$AVGA=(AS(1)+AS(2)+\ldots+AS(N))/N$$

$$AVGB=(BS(1)+BS(2)+\ldots+BS(N))/N \quad (1)$$

Next, a correlation value is calculated on the basis of these average values AVGA and AVGB.

$$\text{Correlation value}=AVGB-AVGA \quad (2)$$

The correlation value calculated as above can be directly used as a correction value. Therefore, in this embodiment the pixel data read out via the HCCD 4L and the amplifier 5L and the data subjected to the dark current correction are calculated. That is, letting B(n) be the output obtained by correcting the dark current of the pixel data read out via the HCCD 4L and the amplifier 5L, $$BB(n)=B(n)+\text{correction value(correlation value)} \quad (3)$$

is calculated. Consequently, the level corresponding to the difference D can be corrected. Note that n indicates a pixel number and $1 \leq n \leq K/2$ if the number of photoelectric conversion elements forming one horizontal line is K. Subsequently, an offset value C is added to the pixel data of the left and right frames. Note that A(n) denotes an output obtained by correcting the dark current of the pixel data read out via the HCCD 4R and the amplifier 5R.

$$FB(n)=BB(n)+C \quad (4)$$

$$FA(n)=A(n)+C \quad (5)$$

Accordingly, a waveform shown in FIG. 9C can be obtained.

Note that the offset value C corresponding to the level C in FIG. 9C is an offset value added to both the corrected image data, in order to facilitate the digital signal processing in, e.g., the image processor 104 shown in FIG. 4.

Note also that the output waveforms shown in FIGS. 9B and 9C indicate output as a display image. However, since the output is image data constructed by color components R, G, and B obtained from the image sensing device, the correction value described above is independently generated for each of these color components R, G, and B.

The processing performed by the original image processor 110 shown in FIG. 4 will be described in detail below with reference to FIGS. 4 to 10. FIG. 10 is a flow chart showing the operation of the original image processor 110.

As shown in FIG. 8, pixel data input from the image sensing unit 101 to the original image processor 110 is composed of the outputs from K (horizontal direction)×L (vertical direction) photoelectric conversion elements in the light receiving unit, and the outputs from a plurality of photoelectric conversion elements in the OB units 2L and 2R shown in FIG. 9A. As shown in FIG. 6, of the outputs from these photoelectric conversion elements, those from the left frame and those from the right frame are input parallel to the original image processor 110 via the A/D converter 83 and the A/D converter 84, respectively. The original image processor 110 processes digital pixel data output from these two output systems in parallel.

First, a process of acquiring dark current correction data for use in dark current correction is performed.

The microcomputer 105 controls the image sensing unit 101 to reset it such that outputs from photoelectric conversion elements have an initial value with no light incident on this image sensing unit 101. After that, the microcomputer 105 performs a charge accumulation operation for a predetermined time. In step S10, after this charge accumulation operation is completed, the microcomputer 105 inputs the output digital pixel data from the A/D converters 83 and 84 in parallel.

In step S11, the microcomputer 105 temporarily stores pixel data corresponding to dark current outputs from a plurality of photoelectric conversion elements in the OB units 2L and 2R shown in FIG. 9A, and determines digital data for use in clamping by a known method. Subsequently, the microcomputer 105 clamps pixel data obtained from photoelectric conversion elements in the region of the light-receiving unit 1 shown in FIG. 9A by a known method.

In step S12, the microcomputer 105 stores the clamped data (dark current correction data) into a dark current correction data storage area secured beforehand in the storage unit 103 via the memory control unit 113. Note that in order to facilitate handling of the data after that, the memory controller 113 controls this data storage to the storage unit 103 such that the storage sequence of the pixel data transferred in the direction A by the HCCD 4R is opposite to the read sequence (i.e., such that the storage sequence is in the direction B). It is also possible to reverse the storage sequence of data read out by the HCCD 4L so that the sequence is in the direction A.

The processes from steps S10 to S12 are repeated L times equal to the number of horizontal lines (i.e., until YES in step S13). Consequently, load of dark current correction data of one frame is completed.

Subsequently, the image sensing unit 101 inputs pixel data obtained by normal object image sensing (step S14). This pixel data is also clamped (step S15). The clamped pixel data is stored in a pixel data storage area secured beforehand in the storage unit 103 via the memory controller 113 (step S16). The operations in steps S14 to S16 are repeated L times (until YES in step S17, i.e., until processing of image data of one frame is completed).

Next, to perform dark current correction, the switch 141 is switched to input, to the dark current corrector 114, the image data and the dark current correction data read out from the storage unit 103 via the memory controller 113, thereby correcting the dark current of the pixel data (step S18). Under the control of the microcomputer 105, the dark current corrector 114 adjusts the dark current correction data by calculations on the basis of accumulation time of the pixel data so that the dark current correction data corresponds to the accumulation time when the pixel data is acquired, and subtracts the adjusted dark current correction data from the pixel data. This makes it possible to remove dark current components contained in the pixel data from the individual photoelectric conversion elements, and generate high-quality pixel data having a high S/N ratio. The pixel data subjected to the dark current correction as above is input to the frame correlation extractor 112 and also stored in the storage unit 103.

The frame correlation extractor 112 performs frame correlation extraction in order to obtain a correlation value as a reference for calculating a correction value required to correct a level difference between the right and left frames by the image matching unit 116 (step S19). More specifically, when receiving image data from the correlation extracting portions A and B shown in FIG. 9A, the frame correlation extractor 112 calculates variables AVGA and AVGB by equation (1) described above, and also calculates a correlation value by equation (2) described above.

The output correlation value from the frame correlation extractor 112 is loaded into the microcomputer 105 and processed in accordance with processing contents prepared beforehand. After that, the processed value is reflected on difference correction control by the frame matching unit 116.

Subsequently, the frame matching unit 116 performs frame matching by using the correction value generated by the microcomputer 105 on the basis of the calculated image correlation value (step S20). Since the switch 141 is closed to the frame matching unit 116, the pixel data undergone the dark current correction is read out from the storage unit 103 via the memory controller 113. In this third embodiment, frame matching is done by correcting the image data of the left frame shown in FIG. 6.

In step S20, the image data of the left frame shown in FIG. 6 is input to the frame matching unit 116 via the switch 141. The frame matching unit 116 adds, to the image data of the right frame, a value (offset value) corresponding to the level C shown in FIG. 9C as described previously by using equation (5). On the other hand, when the image data of the left frame shown in FIG. 6 is input to the frame matching unit 116 via the switch 141, the calculations indicated by equations (3) and (4) are performed on the basis of the correlation value of the input line by using the correction value prepared beforehand by the microcomputer 105, thereby correcting the level difference.

After being subjected to the above matching process by the frame matching unit 116, the image data which has been separately output by the two systems of the A/D converters 83 and 84 shown in FIG. 6 and independently processed are integrated as data of each line.

Subsequently, in step S21, the shading corrector 117 multiplies the image data subjected to the frame matching process by a coefficient prepared in advance, thereby correcting distortion produced in the image data by optical factors.

Next, in step S22, the flaw corrector 118 replaces portions, where no appropriate photoelectric conversion outputs can be obtained owing to dust or flaws, with values calculated on the basis of outputs around these portions. The output of a portion having dust or a flaw is different from the outputs of surrounding pixels. Therefore, it is possible to determine that there is dust or a flaw if this difference is larger than a predetermined value.

The image data completely processed by the flaw corrector 118 is sequentially output to the image processor 104.

The frame matching process (step S20), the shading correction process (step S21), and the flaw correction process (step S22) are also performed for each horizontal line. When these processes are repeated L times (YES in step S23), one-frame original image processing for the outputs from photoelectric conversion elements of L horizontal lines is completed.

By the above processing, the output waveform shown in FIG. 9B is corrected into the output waveform shown in FIG. 9C. That is, the difference D shown in FIG. 9B which is the level difference between the right and left frames is corrected. Accordingly, image data having no difference between the left and right frames can be obtained.

In the third embodiment as described above, when correction is to be performed by frame matching, image data for which the correction value is to be obtained is subjected to dark current correction in advance. Consequently, highly accurate frame matching can be performed.

Fourth Embodiment

The fourth embodiment of the present invention will be described below with reference to the accompanying drawings.

Figure 11:
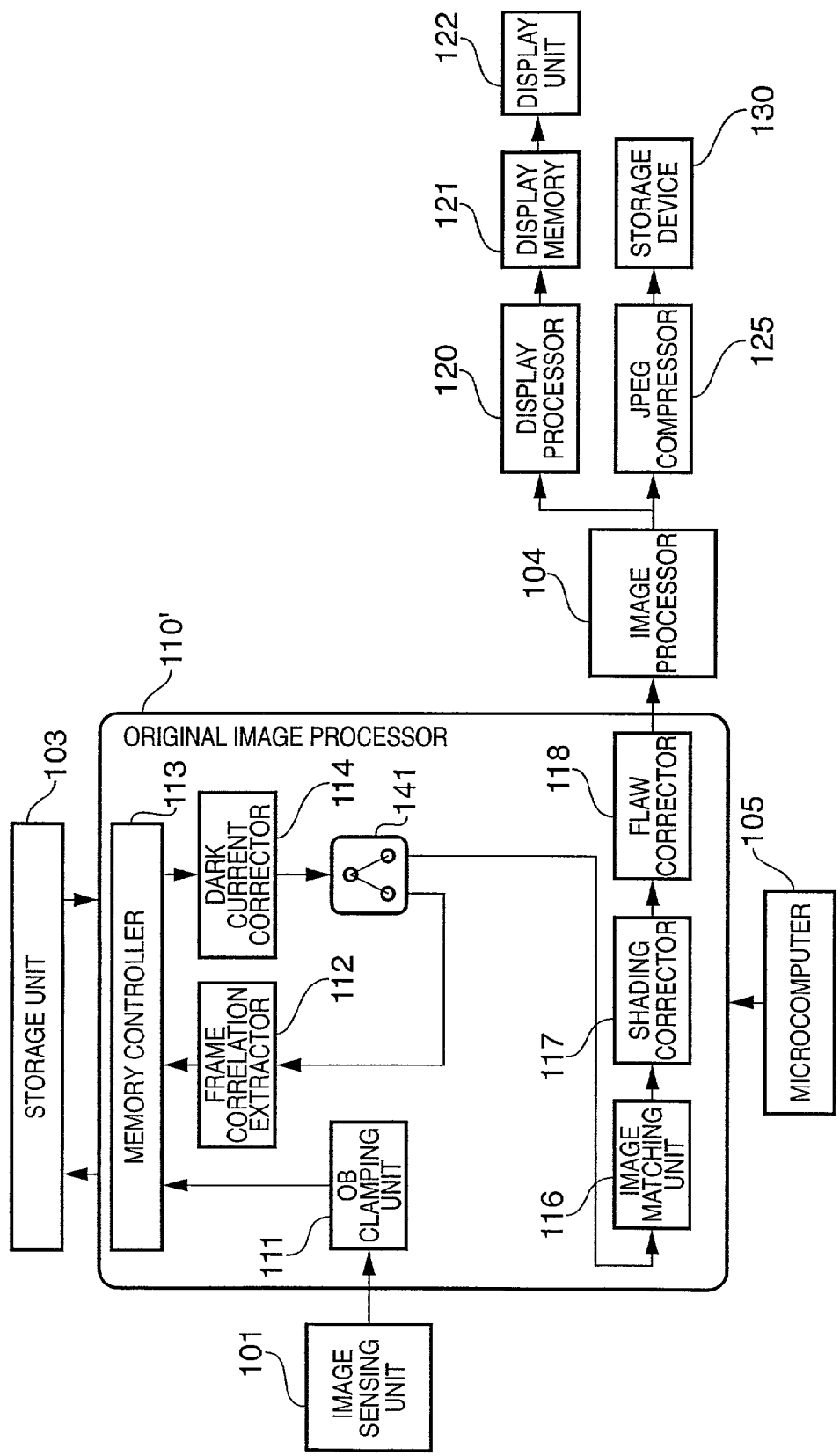
FIG. 11 is a schematic block diagram showing the arrangement of an image sensing apparatus according to a fourth embodiment of the present invention.

FIG. 11 is a schematic block diagram showing the arrangement of an image sensing apparatus such as a digital camera according to the fourth embodiment of the present invention. This arrangement shown in FIG. 11 differs from the arrangement shown in FIG. 4 in that the positions of a switch 141 and a dark current corrector 114 are switched. Note that the same reference numerals as in FIG. 4 denote the same constituent elements in FIG. 11, and a detailed description of the operations of these elements will be omitted.

In the above third embodiment, the original image processor 110 performs dark current correction for one frame of image data as preprocessing of frame correlation extraction, and the image data subjected to this dark current correction is stored in the storage unit 103. In the fourth embodiment, an operation in which pixel data requiring processing is subjected to dark current correction will be explained.

Figure 12:
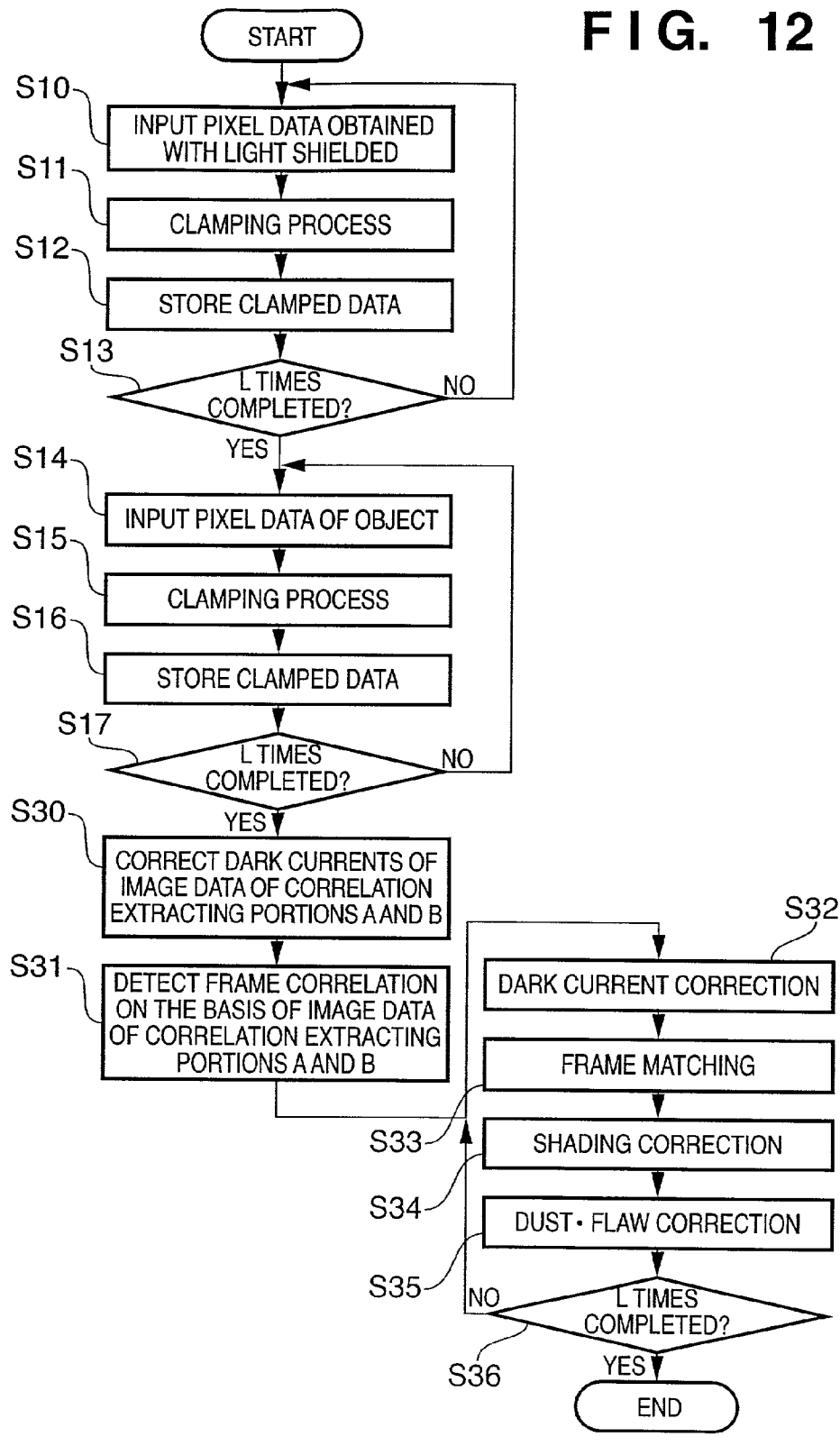
FIG. 12 is a flow chart showing the procedure of an original image processor according to the fourth embodiment of the present invention.

The operation of an original image processor 110' of this fourth embodiment will be described below with reference to FIG. 12.

Figure 10:
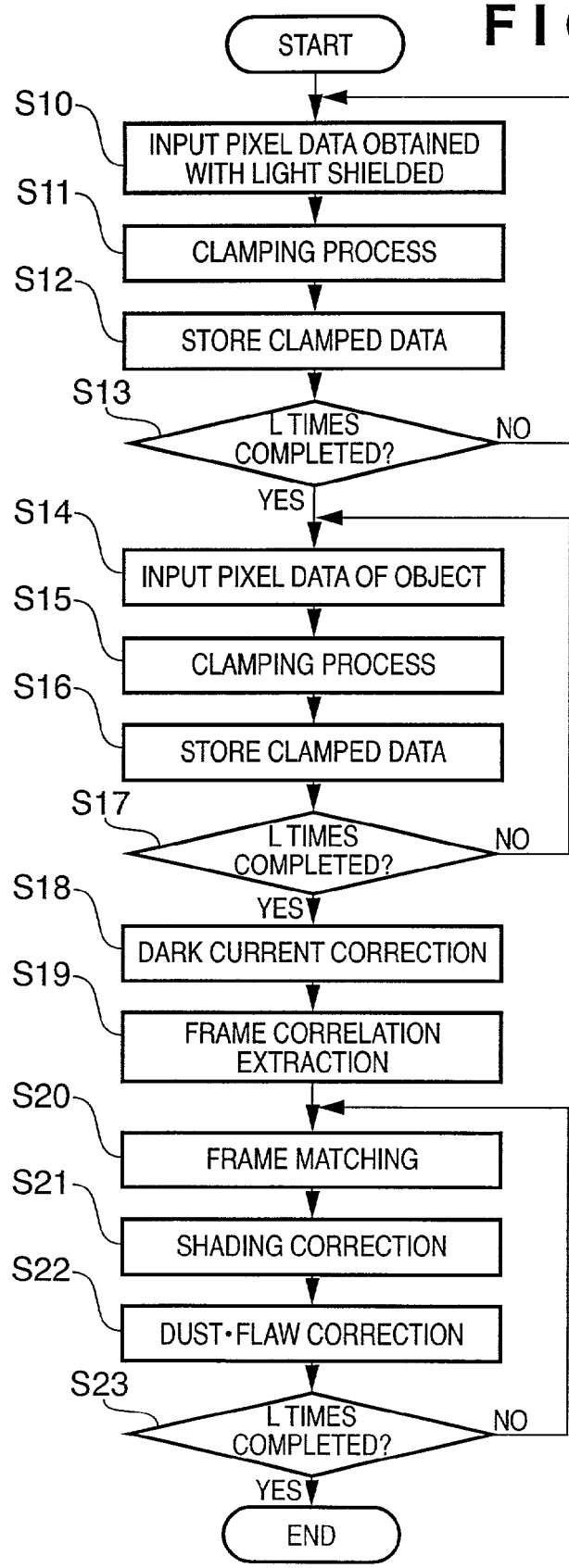
FIG. 10 is a flow chart showing the procedure of an original image processor according to the third embodiment of the present invention.

Processes performed in steps S10 to S17 are similar to those performed in FIG. 10, so a detailed description thereof will be omitted.

In step S30, clamped image data from correlation extracting portions A and B shown in FIG. 9A and dark current correction data are loaded from a storage unit 103 via a memory controller 113. In the fourth embodiment, the switch 141 does not exist between the dark current corrector 114 and the memory controller 113. Therefore, data is directly input from the memory controller 113 to the dark current corrector 114. A dark current correcting operation in this dark current corrector 114 is the same as the operation explained in step S18 of FIG. 10.

To obtain a correlation value in step S31, the switch 141 is so closed as to output the image data subjected to the dark current correction to a frame correlation extractor 112. Accordingly, the dark current corrector 114 outputs the dark-current-corrected image data of the correlation extracting portions A and B to the frame correlation extractor 112. On the basis of the input data, the frame correlation extractor 112 performs the same operation as in step S19 of FIG. 10 to obtain a correlation value. The image data subjected to the dark current correction by the dark current corrector 114 and input to the frame correlation extractor 112 contains only image data from the region of the correlation extracting portions A and B. Therefore, the processes in steps S30 and S31 are completed within time periods much shorter than in the third embodiment.

Subsequently, a frame matching unit 116 performs frame matching by using a correction value generated on the basis of the calculated correlation value by a microcomputer 105. In the fourth embodiment, however, the dark current corrector 114 performs dark current correction before that (step S32).

Since the dark current correction data and image data of one frame are already stored in the storage unit 103, these data are read out from the storage unit 103 to the dark current corrector 114 via the memory controller 113. By using the readout data, dark current correction is performed for the image data of one frame in the same manner as in step S18 of FIG. 10.

Since the switch 141 is so closed as to output data to the frame matching unit 116, the image data subjected to the dark current correction is input to the image matching unit 116. In step S33, frame matching analogous to that in step S20 of FIG. 10 is performed using the correction value generated by the microcomputer 105. When the matching process for the image data of one line is completed, the sequence of the image data of the right frame transferred in a direction A by an HCCD 4R is reversed (i.e., the data sequence is changed to a direction B). This image data of the right frame is combined with the image data of the left frame to form image data of one line. This image data of one line is output to a shading corrector 117. Note that it is also possible to reverse the storage sequence of data read out by an HCCD 4L so that the sequence is in the direction A.

The conversion of the sequence of the image data of the right frame may also be performed by reversing the sequence of read from the storage unit 103 by the memory controller 113 when dark current correction is performed in step S32.

Shading correction (step S34) and dust•flaw correction (step S35) performed after that are similar to the operations in steps S21 and S22 of FIG. 10, so an explanation thereof will be omitted. Steps S32 to S35 are repeated L times (i.e., the number of horizontal lines) to complete the original image processing of one frame (step S36).

In the fourth embodiment as described above, a correction value for frame matching is calculated after only a necessary portion is selected from image data of one frame and subjected to dark current correction. Consequently, highly accurate frame matching similar to that in the third embodiment can be performed with a system configuration in which memory control processing is simple.

Fifth Embodiment

The fifth embodiment of the present invention will be explained below with reference to the accompanying drawings.

In the above third and fourth embodiments, image data is always subjected to dark current correction as preprocessing of frame correlation extraction. In the fifth embodiment, it is possible to choose whether to perform this dark current correction as preprocessing of frame correlation extraction.

Figure 13:
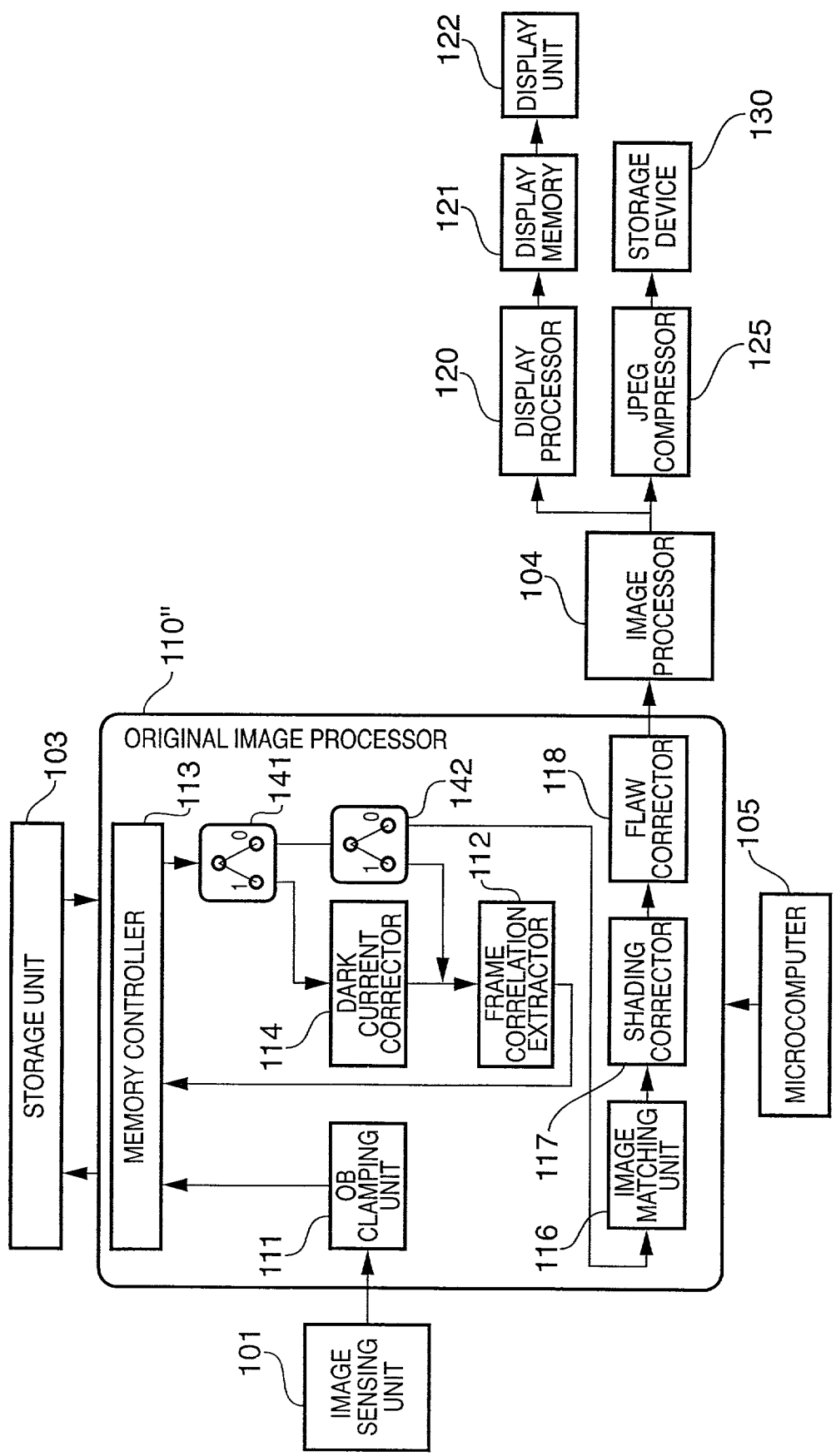
FIG. 13 is a schematic block diagram showing the arrangement of an image sensing apparatus according to a fifth embodiment of the present invention.

FIG. 13 is a view showing the brief arrangement of an image sensing apparatus according to the fifth embodiment. This arrangement is the same as the arrangement shown in FIG. 4 except that a switch 142 is added. Therefore, the functions of the other constituent elements are the same as in FIG. 4, so these elements are denoted by the same reference numerals as in FIG. 4, and a detailed description thereof will be omitted.

Figure 14:
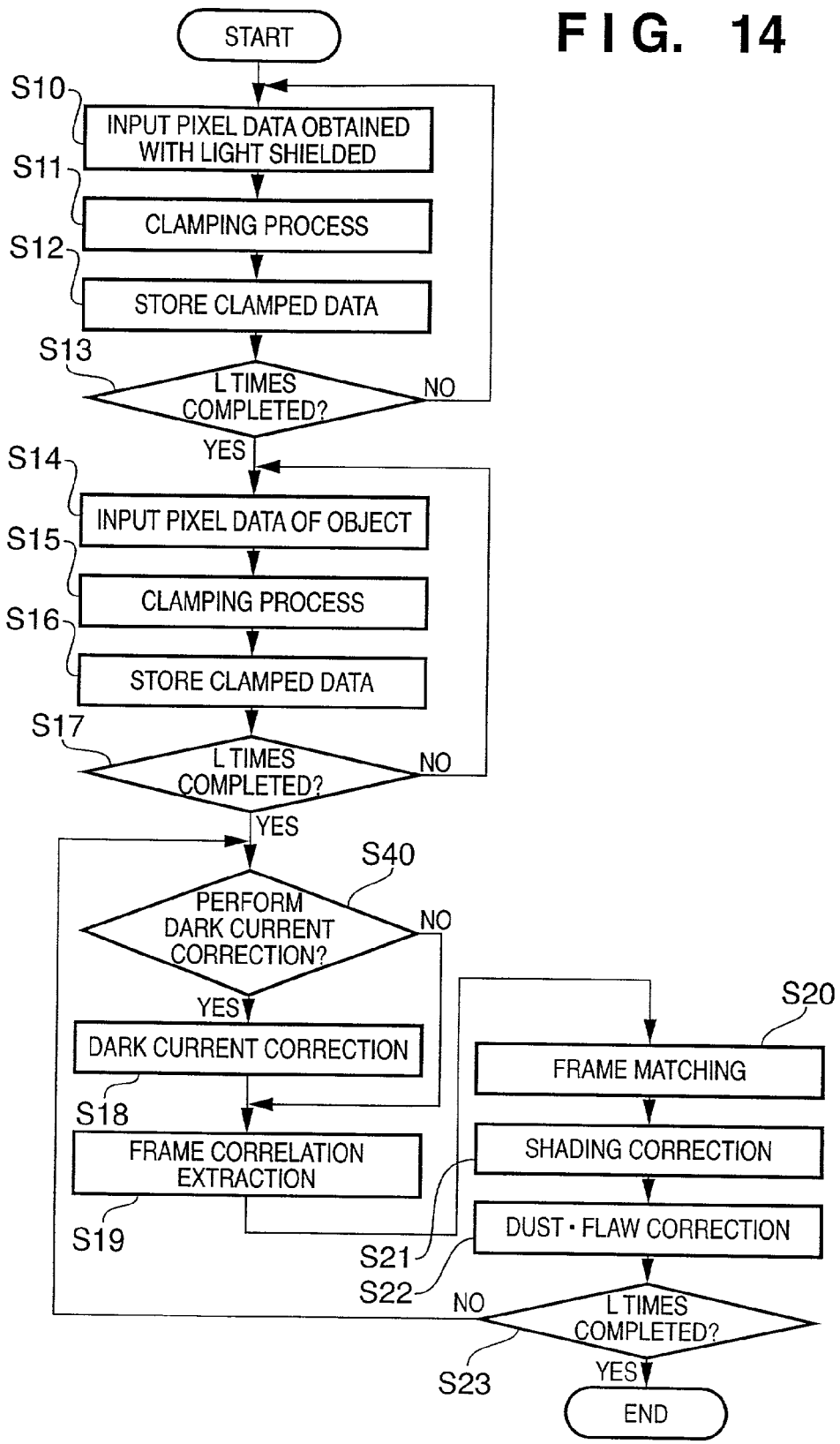
FIG. 14 is a flow chart showing the procedure of an original image processor according to the fifth embodiment of the present invention.

The operation of an original image processor 110" will be explained below with reference to FIG. 14. Note that the same reference numerals as in FIG. 10 denote the same processes, and a detailed description thereof will be omitted.

In step S40, whether to perform dark current correction is determined. If dark current correction is to be performed, a switch 141 is set to "1" to output data to a dark current corrector 114, and the flow advances to step S18. If no dark current correction is to be performed, the switch 141 is set to "0" and the switch 142 is set to "1" to output image data directly to a frame correlation extractor 112 by bypassing the dark current corrector 114, and the flow advances to processing in step S19.

Figure 15:
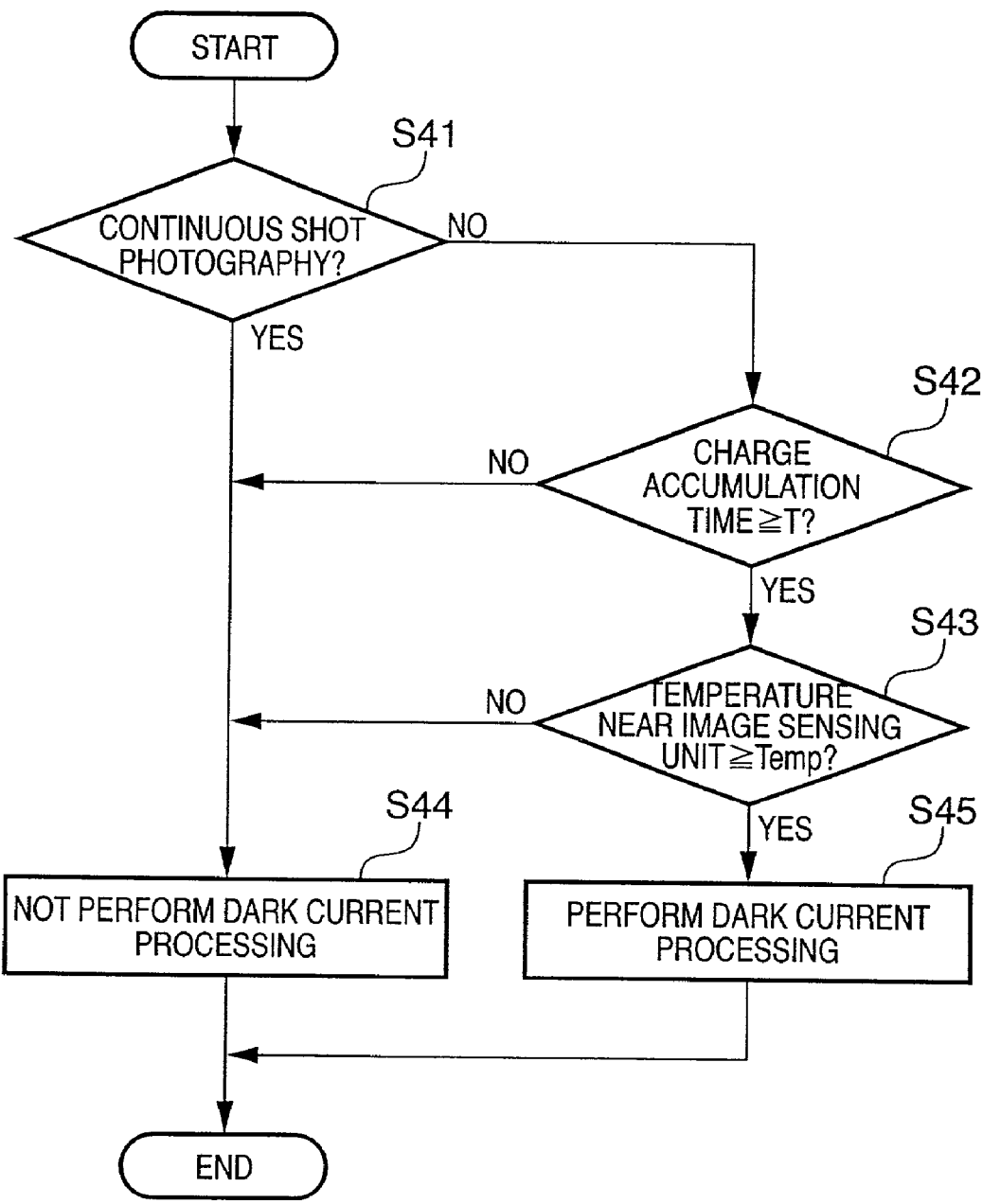
FIG. 15 is a flow chart showing the operation of determining whether to execute dark current correction according to the fifth embodiment of the present invention.
Figure 16:
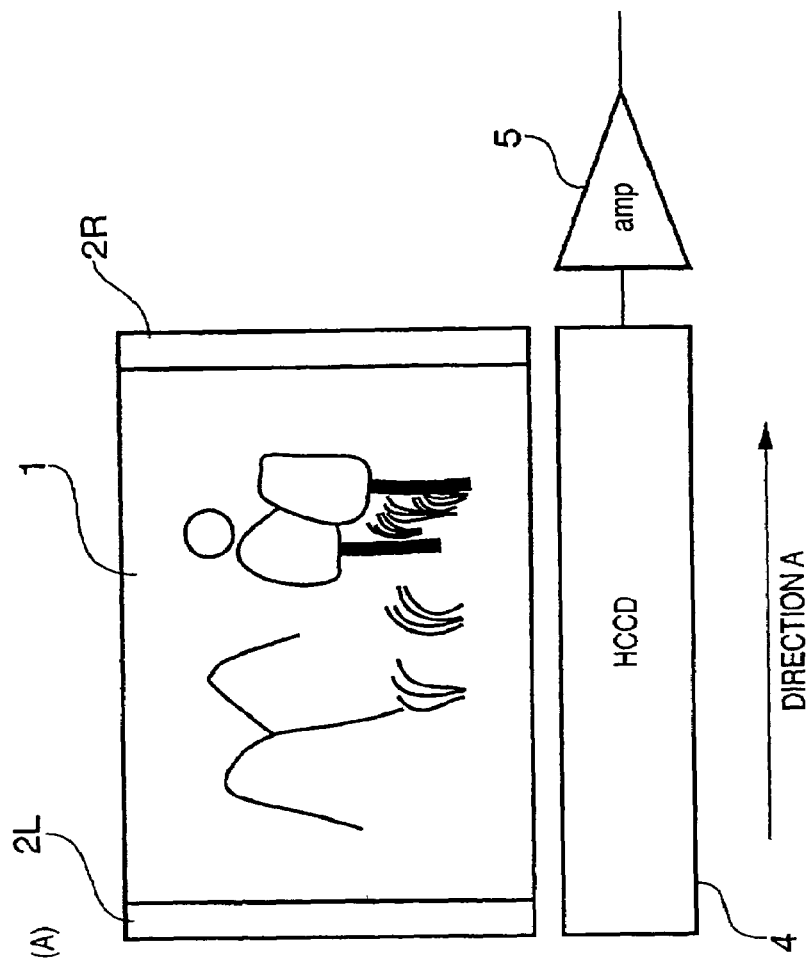
FIG. 16 is a view showing the arrangement of a conventional image sensing device.
Figure 17:
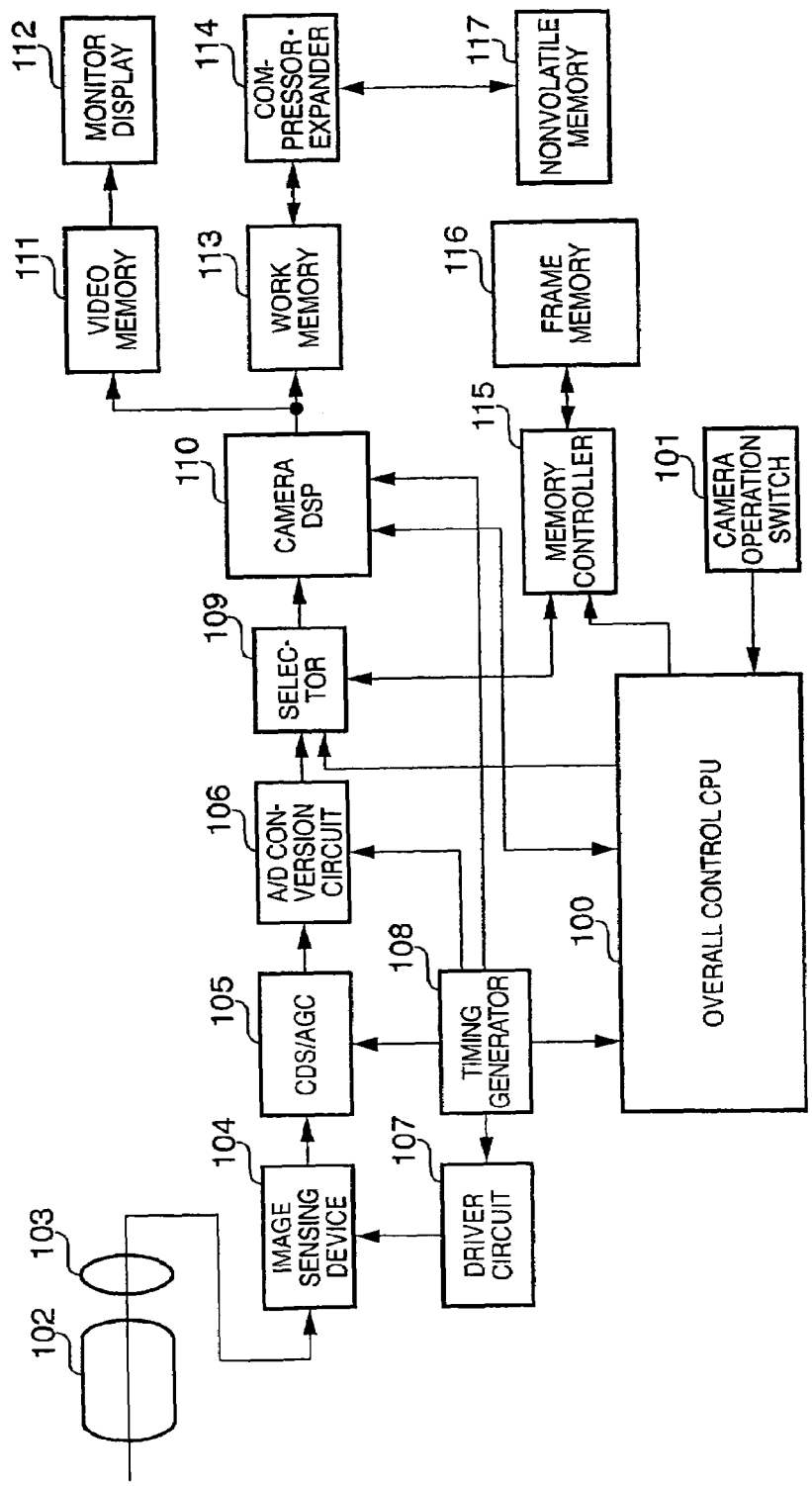
FIG. 17 is a view showing the arrangement of a general digital camera.

An example of the operation of determining whether to perform dark current correction in step S40 will be described below with reference to a flow chart in FIG. 15.

In step S41, whether the operation mode of the camera is continuous shot or single shot photography is determined. If the camera operation mode is continuous shot photography mode, it is determined that no dark current correction is to be performed (step S44). If the camera operation mode is single shot photography mode, in step S42 whether the charge accumulation time in an image sensing unit 101 is equal to or longer than a predetermined time T is checked. If the charge accumulation time is shorter, it is determined that no dark current correction is to be performed (step S44). If the charge accumulation time is longer, the flow advances to step S43 to measure the present temperature of or near the image sensing unit 101 by a thermometer (not shown), and check whether this present temperature is equal to or higher than a predetermined temperature Temp. If the present temperature is higher, it is determined that dark current correction is to be performed (step S44). If the present temperature is lower, it is determined that no dark current correction is to be performed (step S45).

If the charge accumulation time is short or the temperature of the image sensing unit is low and so differences between the individual dark current outputs of a plurality of photoelectric conversion elements are relatively small, the influence of negative factors such as the processing time and current consumption increases compared to the correcting effect of dark current correction. More specifically, dark current correction widens the photographic intervals especially when the camera is operating in the continuous shot photography mode. Therefore, optimum processing can be performed by selecting whether to perform dark current correction for image data to be subjected to frame correlation extraction in accordance with the above factors.

Note that the determination conditions are design items, so it will be readily understood that these determination conditions can be properly changed on the basis of various conditions.

As described above, it is possible to reduce offset differences between a plurality of image signals output from a plurality of output terminals arranged in one-to-one correspondence with a plurality of regions in an image sensing device. As a consequence, a good image having natural boundaries between these regions can be obtained.

It is also possible to increase the number of pixels of an image sensing device.

Other Embodiment

In the above third to fifth embodiments, correction is so performed as to match the level of the image data of the left frame shown in FIG. 6 with that of the image data of the right frame. However, it is also possible to match the level of the image data of the right frame with that of the image data of the left frame, or to match the levels of the image data of both the left and right frames with an intermediate level. These operations can be easily performed by changing the correction value based on the correlation value obtained by the frame correlation extractor 112.

The present invention is not limited to the arrangements explained in the above embodiments. For example, input signals need not be R, G, and B color components, luminance components, and color difference components. Also, an image sensing device need not be a CCD image sensing device. For example, the present invention is similarly applicable to an image sensing device such as a CMOS. Furthermore, one photographed image frame can be divided into three or more image blocks. The frame matching method can also be, e.g., statistical processing different from the contents explained in the above embodiments, provided that the function of the present invention can be achieved.

The present invention is applicable not only to a digital camera but also to an optical apparatus other than a camera or to some other apparatus, as long as the apparatus processes an image signal obtained by image sensing by two-dimensionally arranged photoelectric conversion elements, and finally outputs the signal as an image to an output device such as a monitor or printer.

Also, the present invention can be applied to various image sensing apparatuses such as a video movie camera, video still camera, lens interchangeable camera, single-lens reflex camera, lens shutter camera, and monitor camera, and to apparatuses including these image sensing apparatuses.

In the above embodiments, image signals obtained by an area sensor are separately read from different predetermined regions via a plurality of output systems (e.g., HCCDs and amplifiers). However, the present invention is not restricted to this method. For example, it is also possible to photograph a plurality of images by shifting a photographic region or using a plurality of area sensors, and synthesize these photographed images to obtain an image of a wide object region. That is, the present invention is applicable to various cases in which one image is acquired by synthesizing image signals output from predetermined regions.

The whole or part of the software in the above embodiments can be replaced with hardware. Likewise, the hardware in the above embodiments can be replaced entirely or partly with software.

Also, the apparatuses and methods according to the above embodiments can either in whole or in part constitute the invention.

Furthermore, the apparatuses and their components according to the above embodiments can be practiced as part of another apparatus or in combination with another apparatus.

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM, and computer network, such as LAN (local area network) and LAN, can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts 7, 9 or 11, or an operation described in the embodiments.

The present invention is not limited to the above embodiments and various changes and modifications can be made within the spirit and scope of the present invention. Therefore to apprise the public of the scope of the present invention, the following claims are made.

What is claimed is:

1. A signal processing apparatus for processing an image signal, comprising:
    a driving unit adapted to drive an image sensing unit which comprises a plurality of image sensing regions of one frame, a plurality of charge transfer elements in one-to-one correspondence with said plurality of image sensing regions, for respectively transferring image signals generated in said corresponding image sensing regions, and a plurality of output terminals in one-to-one correspondence with said plurality of charge transfer elements, for outputting said image signals transferred by said corresponding charge transfer elements, and to make said respective output terminals output image signals and dummy image signals from said corresponding image sensing regions;

a first processor adapted to reduce offset differences between said plurality of image signals outputted from said plurality of output terminals by correcting said image signals on the basis of said dummy image signals obtained in association with an image sensing operation for reading out said image signals from said plurality of output terminals;

a second processor adapted to reduce gain differences between said plurality of image signals outputted from said plurality of output terminals by correcting each of said image signals outputted from said respective output terminals based on a gain correction value predetermined prior to said image sensing operation; and a synthesizing unit adapted to synthesize said image signals outputted from the respective output terminals after having undergone offset correction by said first processor and gain correction by said second processor into one image, wherein said dummy image signals are obtained from said output terminals, during which time said image signals are not outputted from said output terminals, by driving said charge transfer elements in a similar manner as said image signals are transferred.

2. The signal processing apparatus according to claim 1, wherein said first processor comprises a dummy clamping processor adapted to clamp said image signals outputted from said output terminals on the basis of said corresponding dummy image signals.

3. The signal processing apparatus according to claim 1, wherein said first processor corrects said image signals on the basis of said dummy image signals outputted from said output terminals before said image signals to be corrected are outputted.

4. The signal processing apparatus according to claim 1, wherein said first processor corrects said image signals on the basis of said dummy image signals outputted from said output terminals after said image signals to be corrected are outputted.

5. The signal processing apparatus according to claim 1 further comprising an optical black processor adapted to correct said image signals outputted from said plurality of output terminals on the basis of an optical black level of an optical black region included in one of said plurality of image sensing regions.

6. A signal processing method for processing an image signal, comprising:

a control step of controlling a driving means adapted to drive an image sensing unit which comprises a plurality of image sensing regions of one frame, a plurality of charge transfer elements in one-to-one correspondence with said plurality of image sensing regions, for respectively transferring image signals generated in said corresponding image sensing regions, and a plurality of output terminals in one-to-one correspondence with said plurality of charge transfer elements, for outputting said image signals transferred by said corresponding charge transfer elements, and to make said respective output terminals output image signals and dummy image signals from said corresponding image sensing regions;

a first processing step of reducing offset differences between said plurality of image signals outputted from said plurality of output terminals by correcting said image signals on the basis of said dummy image signals obtained in association with an image sensing operation for reading out said image signals from said plurality of output terminals;

a second processing step of reducing gain differences between said plurality of image signals outputted from said plurality of output terminals by correcting each of said image signals outputted from said respective output terminals based on a gain correction value predetermined prior to said image sensing operation;

a synthesizing step of synthesizing said image signals outputted from the respective output terminals after having undergone offset correction in said first processing step and gain correction in said second processing step, wherein said dummy image signals are obtained from said output terminals, during which time said image signals are not outputted from said output terminals, by driving said charge transfer elements in a similar manner as said image signals are transferred.

7. A computer readable program including instructions for controlling a processing means to carry out the method of claim 6.

8. A computer readable medium storing the computer readable program of claim 7.

* * * * *